US009221455B2

(12) United States Patent
Ito et al.

(10) Patent No.: US 9,221,455 B2
(45) Date of Patent: Dec. 29, 2015

(54) DRIVE CONTROL APPARATUS AND METHOD FOR PROVIDING A DRIVE CONTROL TO A HYBRID ELECTRIC VEHICLE, AND HYBRID ELECTRIC VEHICLE

(75) Inventors: Yoshiki Ito, Shizuoka (JP); Masaaki Tagawa, Shizuoka (JP); Masakazu Saito, Shizuoka (JP); Hitoshi Ohkuma, Shizuoka (JP); Yukihiro Hosoe, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 105 days.

(21) Appl. No.: 13/981,576

(22) PCT Filed: Feb. 3, 2011

(86) PCT No.: PCT/JP2011/000620

§ 371 (c)(1),
(2), (4) Date: Jul. 24, 2013

(87) PCT Pub. No.: WO2012/104923

PCT Pub. Date: Aug. 9, 2012

(65) Prior Publication Data

US 2013/0304297 A1 Nov. 14, 2013

(51) Int. Cl.
*B60L 9/00* (2006.01)
*B60L 11/00* (2006.01)
(Continued)

(52) U.S. Cl.
CPC .............. *B60W 20/108* (2013.01); *B60K 6/445* (2013.01); *B60W 10/06* (2013.01); *B60W 10/08* (2013.01);
(Continued)

(58) Field of Classification Search
CPC ...... B60K 6/445; B60W 10/06; B60W 10/08; B60W 20/00; B60W 30/1882; B60W 20/108; B60W 2710/0644; B60W 2600/00; B60W 2710/086; B60W 20/208; Y10S 903/93; F16H 2037/102; Y02T 10/6239; Y02T 10/6286
USPC .......................................................... 701/22
See application file for complete search history.

(56) References Cited

U.S. PATENT DOCUMENTS

2007/0179014 A1* 8/2007 Endo et al. ........................ 477/3
2007/0197336 A1* 8/2007 Tabata et al. .................. 475/150
(Continued)

FOREIGN PATENT DOCUMENTS

JP 2006-250112 A 9/2006
JP 2006-315664 A 11/2006
(Continued)

OTHER PUBLICATIONS

International Search Report mailed Apr. 19, 2011 in PCT/JP2011/000620.
(Continued)

*Primary Examiner* — Calvin Cheung
*Assistant Examiner* — Paula L Schneider
(74) *Attorney, Agent, or Firm* — Rothwell, Figg, Ernst & Manbeck, P.C.

(57) ABSTRACT

An apparatus that both prevents excessive engine speed and satisfies a driver's requested drive torque. A control apparatus provides torque control to a hybrid electric vehicle and uses a calculated engine speed final target, and engine speed temporary target, which may not exceed an upper limit. In addition the control recalculates an engine operating point target based on the calculated engine speed final target and calculates an engine power final target based on the recalculated engine operating point target. An electrical power target is calculated based on the calculated engine power final target. Engine torque is controlled based on the calculated engine operating point target (especially the engine torque final target). In addition, motor generators are controlled to operate in power running mode or regenerating mode, based on the calculated engine operating point target and electrical power target.

7 Claims, 14 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 20/00* (2006.01)
*B60K 6/445* (2007.10)
*B60W 10/06* (2006.01)
*B60W 10/08* (2006.01)
*B60W 30/188* (2012.01)
*F16H 37/10* (2006.01)

(52) U.S. Cl.
CPC ........... *B60W 20/00* (2013.01); *B60W 30/1882* (2013.01); *B60W 2600/00* (2013.01); *B60W 2710/0644* (2013.01); *B60W 2710/086* (2013.01); *F16H 2037/102* (2013.01); *Y02T 10/6239* (2013.01); *Y02T 10/6286* (2013.01); *Y10S 903/93* (2013.01)

(56) References Cited

U.S. PATENT DOCUMENTS

| | | | | |
|---|---|---|---|---|
| 2008/0033620 A1* | 2/2008 | Kamichi et al. | | 701/59 |
| 2008/0097684 A1* | 4/2008 | Syed et al. | | 701/106 |
| 2008/0132379 A1* | 6/2008 | Matsubara et al. | | 477/3 |
| 2008/0194371 A1* | 8/2008 | Matsubara et al. | | 475/150 |
| 2008/0215214 A1* | 9/2008 | Matsubara et al. | | 701/51 |
| 2008/0242464 A1* | 10/2008 | Kumazaki et al. | | 475/136 |
| 2009/0152029 A1* | 6/2009 | Matsubara et al. | | 180/65.265 |
| 2009/0157269 A1* | 6/2009 | Matsubara et al. | | 701/54 |
| 2010/0081539 A1* | 4/2010 | Endo et al. | | 477/3 |
| 2013/0253749 A1* | 9/2013 | Hayashi et al. | | 701/22 |

FOREIGN PATENT DOCUMENTS

| | | |
|---|---|---|
| JP | 2007-239504 A | 9/2007 |
| JP | 2007-296937 A | 11/2007 |
| JP | 2008-12992 A | 1/2008 |
| JP | 2009-280094 A | 12/2009 |
| JP | 2010-254101 A | 11/2010 |

OTHER PUBLICATIONS

Office Action mailed May 26, 2015 in corresponding Chinese Patent Application No. 201180066664.2 (with an English translation) (10 pages).

* cited by examiner

DRIVE CONTROL APPARATUS AND METHOD FOR PROVIDING A DRIVE CONTROL TO A HYBRID ELECTRIC VEHICLE, AND HYBRID ELECTRIC VEHICLE

CROSS REFERENCE TO RELATED APPLICATION

This application is a 35 U.S.C. 371 National Phase Entry Application from PCT/JP2011/000620, filed Feb. 3, 2011, the disclosure of which is incorporated herein in its entirety by reference.

TECHNICAL FIELD

The present invention relates to technology associated with a hybrid electric vehicle including, as power sources, an engine and motor generators.

BACKGROUND ART

In a drive control apparatus for providing a drive control to a hybrid electric vehicle by driving drive shafts connected to traction wheels by composing output of an engine and outputs of first and second motor generators, there is a technology of: calculating a charge/discharge power target based on a battery SOC (state of charge) together with calculating a drive power target requested by the vehicle driver based on a drive torque target, which has, as parameters, an accelerator pedal position and a vehicle speed, and the vehicle speed; calculating, as an engine power target, the sum of the calculated drive power target and the calculated charge/discharge power target; and calculating an engine operating point from the calculated engine power target (see Patent Literature 1, for example).

In such drive control apparatus for providing a drive control to a hybrid electric vehicle, first and second motor generators are controlled to operate in power running mode or regenerating mode together with controlling the engine torque and speed so that the engine may operate at the calculated engine operating point target (see Patent Literatures 1 and 2, for example).

PRIOR ART

Patent Literature

Patent Literature 1: JP-A 2008-12992
Patent Literature 2: JP-A 2007-296937

SUMMARY OF INVENTION

Problem to be Solved by Invention

In the above mentioned drive control apparatus for providing a drive control to a hybrid electric vehicle, since a balance is kept between, for example, the engine speed and the motor generator speed(s), there is need to prevent the engine speed from becoming high if the motor generator speed is to be kept lower than or equal to a desired speed.

On the other hand, in said drive control apparatus for providing a drive control to a hybrid electric vehicle, if the engine speed is prevented from becoming high, this results in preventing the engine output from becoming high, providing drive torque less than requested by the vehicle driver, making it difficult to satisfy the drive torque requested by the vehicle driver.

An object of the present invention is to both prevent the engine speed from becoming too much high and satisfy the drive torque requested by the vehicle driver.

Means to Solve Problem

In order to solve said problem, there is provided, according to an embodiment of the present invention, a drive control apparatus for providing a drive control to a hybrid electric vehicle by controlling an engine and motor generators, which are operable to give a charge of electrical power to a battery and receive a supply of electrical power from said battery, to power the vehicle with driving force derived from said engine and said motor generators, the drive control apparatus comprising: a drive power target calculation function for calculating a drive power target based on an accelerator pedal position and the vehicle speed; a charge/discharge power target calculation function for calculating a charge/discharge electrical power target to/from said battery based on a state of charge/discharge of said battery; an engine power first target calculation function for calculating an engine power first target based on the drive power target, which is calculated by said drive power target calculation function, and the charge/discharge electrical power target, which is calculated by said charge/discharge power target calculation function; an engine operating point first target calculation function for calculating an engine speed first target and an engine torque first target, both of which correspond to the engine power first target calculated by said engine power first target calculation function, based on information of the engine operating point identified by the relation between engine speed and engine torque; an engine speed first target upper limit calculation function for calculating an upper limit of said engine speed first target based on the vehicle speed; an engine speed second target calculation function for calculating an engine speed second target indicative of the engine speed first target which is calculated by said engine operating point calculation function so as not to exceed that upper limit of the engine speed first target which is calculated by said engine speed first target upper limit calculation function; an engine torque second target calculation function for calculating an engine torque second target, which corresponds to said engine speed second target calculated by said engine speed second target calculation function, based on said information of the engine operating point; an engine power second target calculation function for calculating an engine power second target based on the engine speed second target which is calculated by said engine speed second target calculation function and the engine torque second target which is calculated by said engine torque second target calculation function; an electrical power target calculation function for calculating an electrical power target indicative of the amount of electrical power to be generated by driving said motor generators to charge said battery or to be provided by said battery to said motor generators to drive said motor generators, based on a difference between the drive power target which is calculated by said drive power target calculation function and the engine power second target which is calculated by said engine power second target calculation function; an engine control configured to control torque of said engine based on the engine torque second target which is calculated by said engine torque second target calculation function; and a motor generator control configured to control said motor generators based on the engine speed second target which is calculated by said engine speed second target calculation function, the engine torque second target which is calculated by said engine torque second target calculation function, and the electrical power target which is calculated by said electrical target calculation function.

That is, the embodiment of the present invention calculates an engine speed second target so that an engine speed first target on an engine operating point target, which is calculated from an engine power first target initially calculated, may not exceed an upper limit; recalculates an engine operating point target based on the calculated engine speed second target; calculates an engine power second target based on the recalculated engine operating point target; calculates an electrical power target based on the calculated engine power second target; controls torque of the engine based on the calculated engine operating point target (especially the engine torque second target); and controls the motor generators, i.e. operating the motor generators in power running mode or regenerating mode, based on the calculated engine operating point target and electrical power target.

Moreover, in the embodiment of the present invention, it is preferable that there is further provided an engine power target upper limit calculation function for calculating, as an upper limit of said engine power first target, a maximum of output which the engine is able to provide; and that said engine power first target calculation function calculates said engine power first target so as not to exceed the upper limit which is calculated by said engine power target upper limit calculation function.

Moreover, in the embodiment of the present invention, it is preferable that there is provided a power split and composition system having four axes with each of rotary elements of two planetary gear arrangements connected; that two motor generators are connected to said battery; that, in a manner that one of said motor generators, said engine, a drive shaft connected to a traction wheel, and the other of said motor generators are located on a collinear diagram, the four axes of said power split and composition system are connected to said one motor generator, said engine, said drive shaft and said the other motor generator, respectively; that an upper limit of said engine speed is restricted by an upper limit of rotational speed of said one motor generator and undergoes a change depending on the vehicle speed; and that said engine speed first target upper limit calculation function calculates the upper limit of said engine speed first target based on said vehicle speed and an upper limit of rotational speed of said one motor generator.

Moreover, according to the embodiment of the present invention, there is provided a hybrid electric vehicle with the drive control apparatus mentioned in the foregoing description.

Moreover, according to the embodiment of the present invention, there is provided a drive control method for providing a drive control to a hybrid electric vehicle by controlling an engine and motor generators, which are operable to give a charge of electrical power to a battery and receive a supply of electrical power from said battery, to power the vehicle with driving force derived from said engine and said motor generators, the drive control method comprising the steps of: calculating a drive power target based on an accelerator pedal position and the vehicle speed; calculating a charge/discharge electrical power target to/from said battery based on a state-of-charge/discharge of said battery; calculating an engine power first target based on said drive power target and said charge/discharge electrical power target; calculating an engine speed first target and an engine torque first target, both of which correspond to said engine power first target, based on information of the engine operating point identified by the relation between engine speed and engine torque; calculating an upper limit of said engine speed first target based on the vehicle speed; calculating an engine speed second target indicative of the engine speed first target so as not to exceed said upper limit of the engine speed first target; calculating an engine torque second target, which corresponds to said engine speed second target, based on said information of engine operating point; calculating an engine power second target based on said engine speed second target and said engine torque second target; calculating an electrical power target indicative of the amount of electrical power to be generated by driving said motor generators to charge said battery or to be provided by said battery to said motor generators to drive said motor generators, based on a difference between said drive power target and said engine power second target; controlling torque of said engine based on said engine torque second target; and controlling said motor generators based on said engine speed second target, said engine torque second target, and said electrical power target.

Effect of Invention

The embodiment of the present invention prevents becoming too high by calculating an engine speed target so that it may not exceed the upper limit, and enables the motor generators to operate in power running mode by calculating an electrical power target based on the engine speed target calculated not to exceed the upper limit, thus compensating for a reduction in the engine output to satisfy drive torque requested by the vehicle driver.

DESCRIPTION OF EMBODIMENT(S)

Referring, next, to the drawings, one embodiment of a drive control apparatus for providing a drive control to a hybrid electric vehicle according to the present invention is described.

(Configuration of Drive Control Apparatus for Hybrid Electric Vehicle)

Figure 1:
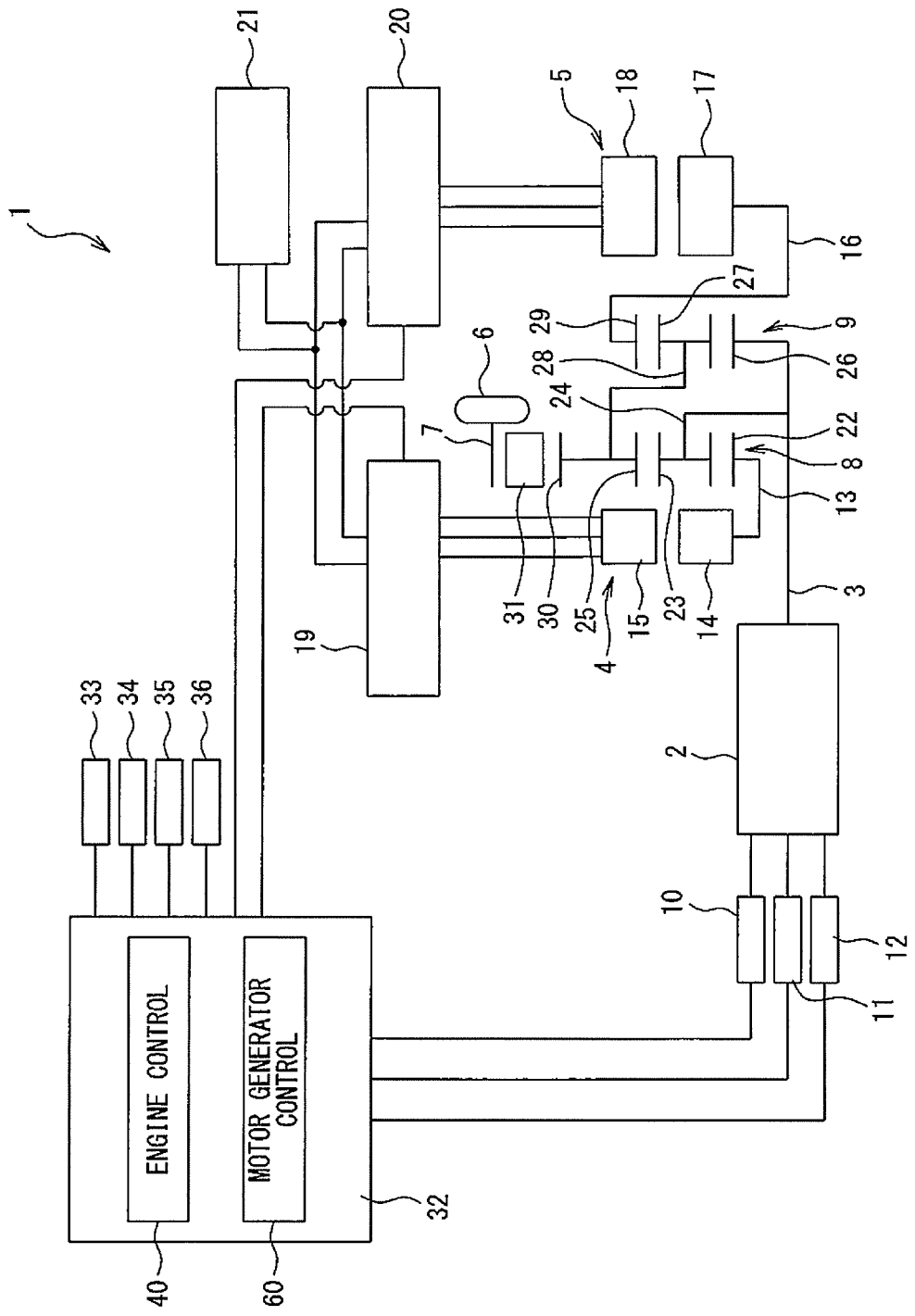
FIG. 1 is an example of system configuration diagram showing one embodiment of a drive control apparatus for providing a drive control to a hybrid electric vehicle according to the present invention.

FIG. 1 shows an example of system configuration diagram showing one embodiment of a drive control apparatus 1 for providing a drive control to a hybrid electric vehicle according to the present invention (called hereinafter "a drive control apparatus".

Referring now to FIG. 1, as its powertrain, the hybrid electric vehicle includes: an engine (an internal combustion engine) 2 that may provide drive power generated due to internal combustion of fuel, a first motor generator (a dynamotor) 4 and a second motor generator (a dynamotor) 5, each of which is able to generate drive power by electrical energy (power running) or electrical energy by regeneration, drive shafts 7 connected to traction wheels 6 of the vehicle, a first and a second planetary gear arrangements 8 and 9, which provide a power split and composition system that composes or splits drive power from engine 2, first motor generator 4 and second motor generator 5 and ground reaction that is delivered from traction wheels 6, and an output gearing 31 that provides a drive connection between the power split and composition system and drive shafts 7.

First motor generator 4 has a first rotor shaft 13, a first rotor 14 and a first stator 15. Second motor generator 5 has a second rotor shaft 16, a second rotor 17 and a second stator 18.

First stator 15 of first motor generator 4 is electrically coupled to a first inverter 19, and second stator 18 of second motor generator 5 is electrically coupled to a second inverter 20. First and second inverters 19 and 20 in turn are electrically coupled to a battery 21. First and second inverters 19 and 20 control the amount of electrical energy delivered from battery 21 to first and second stators 15 and 18. First and second inverters 19 and 20 are electrically coupled to a drive controller 32 configured to perform a drive control.

Changes in the field current, for example, may control the drive power provided by first and second motor generators 4 and 5, more specifically, a rotational speed and a driving torque, which, hereinafter, may be also called a motor generator rotational speed and a motor generator torque. Moreover, each of first and second motor generators 4 and 5 is able to operate in regenerating mode, when it provides torque in a direction opposite to a direction of its rotation, to generate electrical power, so that the generated electrical energy may be used to charge battery 21.

First planetary gear arrangement 8, as is well known in the art, includes a first sun gear 22, a first carrier 24, which carries first planetary gears 23, and a first ring gear 25. Second planetary gear arrangement 9 includes a second sun gear 26, a second carrier 28, which carries second planetary gears 27, and a second ring gear 29.

In this embodiment, engine 2, first motor generator 4, second motor generator 5, first planetary gear arrangement 8 and second planetary gear arrangement 9 are all disposed on the same axis. First carrier 24 of first planetary gear arrangement 8 and second sun gear 26 of second planetary gear arrangement 9 are coupled together and connected drivably to engine output shaft 3 of engine 2; first sun gear 22 of first planetary gear arrangement 8 is connected drivably to first rotor shaft 13 of first motor generator 4; second ring gear 29 of second planetary gear arrangement 9 is connected drivably to second rotor shaft 16 of second motor generator 5; first ring gear 25 of first planetary gear arrangement 8 and second carrier 28 of second planetary gear arrangement 9 are coupled together and connected to drive shafts 7 for traction wheels 6.

Drive connection to drive shafts 7 is accomplished, for example, by connecting an output portion 30 such as a gear formed on the outer circumference of first ring gear 25 of first planetary gear arrangement 8 to drive shafts 7 with output gearing 31. Drive connection of each of a portion of rotating elements of first planetary gear arrangement 8 to the corresponding one of rotating elements of second planetary gear arrangement 9 is accomplished directly without any power transmitting gear between them, and drive connection of each of the remainder of the rotating elements to the corresponding one of first motor generator 4, second motor generator 5 and engine 2 is accomplished similarly.

Now, collinear diagrams are used to describe relations, in rotational speed, between engine 2 or engine output shaft 3, first and second planetary gear arrangements (power split and composition system) 8 and 9, and output gearing 31.

As described before, first carrier 24 of first planetary gear arrangement 8 and second sun gear 26 of second planetary gear arrangement 9 are directly coupled together, and first ring gear 25 of first planetary gear arrangement 8 and second carrier 28 of second planetary gear arrangement 9 are directly coupled together. Therefore, first carrier 24 and second sun gear 26 turn at the same speed on collinear diagrams for two planetary gear arrangements 8 and 9, and first ring gear 25 and second carrier 28 turn at the same speed, too. Now, overlaying the two collinear diagrams for planetary gear arrangements 8 and 9 makes a collinear diagram, shown in FIG. 2, which has four vertical axes in total, that is, from the left, an axis for first sun gear 22 of first planetary gear arrangement 8 (an axis labeled "MG1" in FIG. 2: first sun gear 22 being equivalent to first rotor shaft 13 of first motor generator 4), an axis for first carrier 24 of first planetary gear arrangement 8 and second sun gear 26 of second planetary gear arrangement 9 (an axis labeled "ENG" in FIG. 2: first carrier 24 and second sun gear 26 being equivalent to engine output shaft 3 of engine 2), an axis for first ring gear 25 of first planetary gear arrangement 8 and second carrier 28 of second planetary gear arrangement 9 (an axis labeled "OUT" in FIG. 2: first ring gear 25 and second carrier 28 being equivalent to output portion 30 of first ring gear 25, i.e. drive shafts 7 for traction wheels 6), an axis for second ring gear 29 of second planetary gear arrangement 9 (an axis labeled "MG2" in FIG. 2: second ring gear 29 being equivalent to second rotor shaft 16 of second motor generator 5). Then, a lever ratio indicative of the relation among the distances, each between the adjacent two of the vertical axes is found: assuming that the distance between the axes ENG and OUT is 1, the distance between the axes ENG and MG1 takes on the value k1 which results from dividing the number of teeth of first ring gear 25 of first planetary gear arrangement 8 by the number of teeth of first sun gear 22, the distance between the axes OUT and MG2 takes on the value k2 which results from dividing the number of teeth of second sun gear 26 of second planetary gear arrangement 9 by the number of teeth of second ring gear 29.

This collinear diagram for the power split and composition system is equivalent to what is previously proposed by the present Applicant in JP Patent No. 3852562. The characteristic of the power split and composition system is that first motor generator 4 and second motor generator 5 are located on one and the other points where the remotest two of the four vertical axes are. The relation in which first and second motor generators 4 and 5 are placed on where the remotest two of the four vertical axes are provides not only, as mentioned in JP Patent No. 3852562, a configuration free from disadvantages such as an increase in number of parts, an increase in size of system, an increase of mechanical loss and so forth, but also, as will be described later, a reduction in the amount of an exchange of electrical energy during driving in ordinary situations with a high gear ratio, which in turn improves fuel efficiency.

Hereinafter, referring to several collinear diagrams, relations between speed and torque of engine 2, travelling speed of the vehicle, speed and torque of first and second motor generator 4 and 5 are described. In each of the collinear diagrams, Tmg1 is the first motor-generator torque provided by first rotor shaft 13 of first motor generator 4, Tmg2 is the second motor-generator torque by second rotor shaft 16 of second motor generator 5, Teng is the engine torque by the engine output shaft 3 of engine 2 and Tout is the output drive torque from output portion 30, i.e. the drive torque delivered to drive shafts 7. In each of the collinear diagrams, it is defined that the rotational speed has a positive direction when the direction is the same as that of engine 2 and the torque, as an input along each of the four axes, has a positive direction when the direction is the same as that of engine torque Teng. Therefore, driving torque Tout from output portion 30 moves the vehicle backward when it has a positive direction and forward when it has a negative direction.

Although operation of a motor generator in the power running or regenerating mode is accompanied by losses which occur at an inverter and a motor generator during power generation so that the efficiency of energy conversion between electrical energy and mechanical energy is not 100%, it is hereinafter assumed that no mechanical, electrical and physical losses take place for simplicity of the following description. Incase there is an actual need to take the losses into consideration, it is sufficient to perform a compensating control for the losses by, for example, generating more electrical power as much as the amount of energy lost as the losses.

Figure 2:
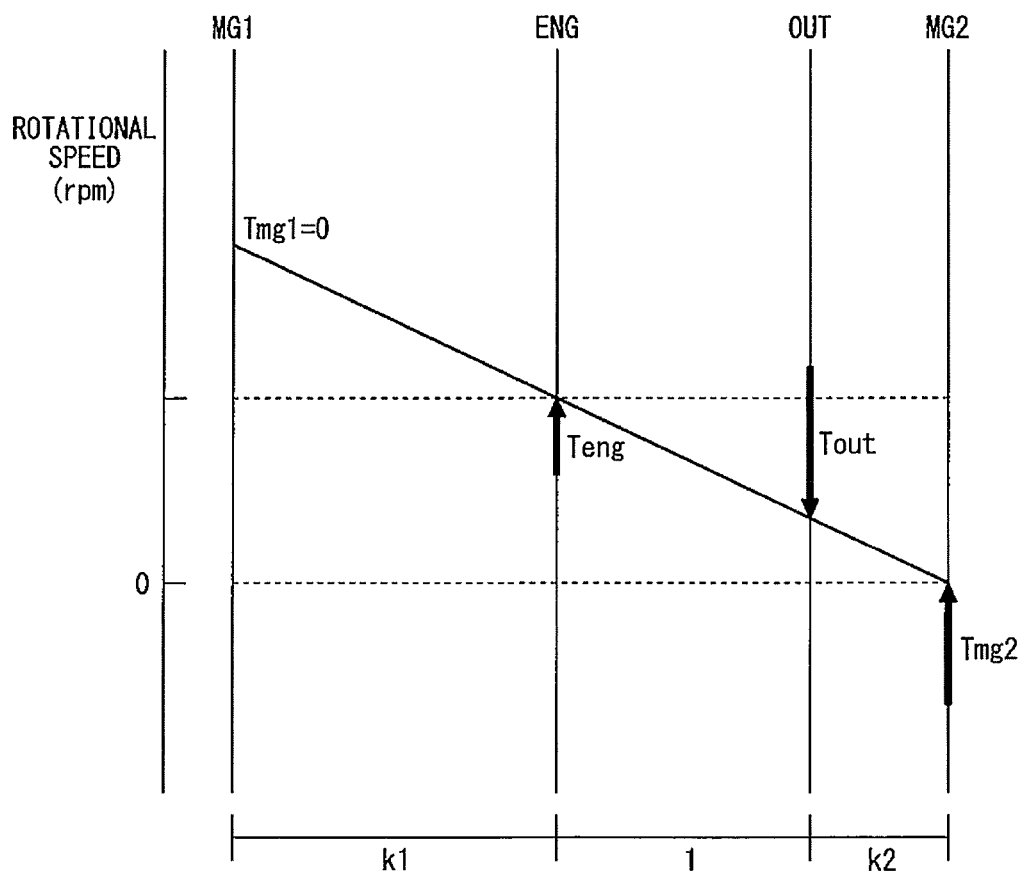
FIG. 2 is an example of collinear diagram for a power split and composition system shown in FIG. 1.

FIG. 2 represents a low-speed drive state in which the vehicle speed (a driving speed of the vehicle) is relatively low and engine (ENG) 2 turns in a positive rotational direction to provide a positive engine torque Teng. Although first motor generator (MG1) 4 turns in the positive rotational direction at a high speed, first motor-generator torque Tmg1 remains 0. Although second motor generator (MG2) 5 provides a positive first motor-generator torque Tmg2, second motor generator (MG2) 5 does not consume electrical power because the second motor-generator rotational speed is 0 (operation out of power running mode). In this case, since a ratio of engine speed of engine 2 to rotational speed of output portion 30, i.e., vehicle speed, called "a gear ratio," is expressed as $(1+k2)/k2$, a state of low gear ratio is established because the transmission ratio is greater than 1.

Figure 3:
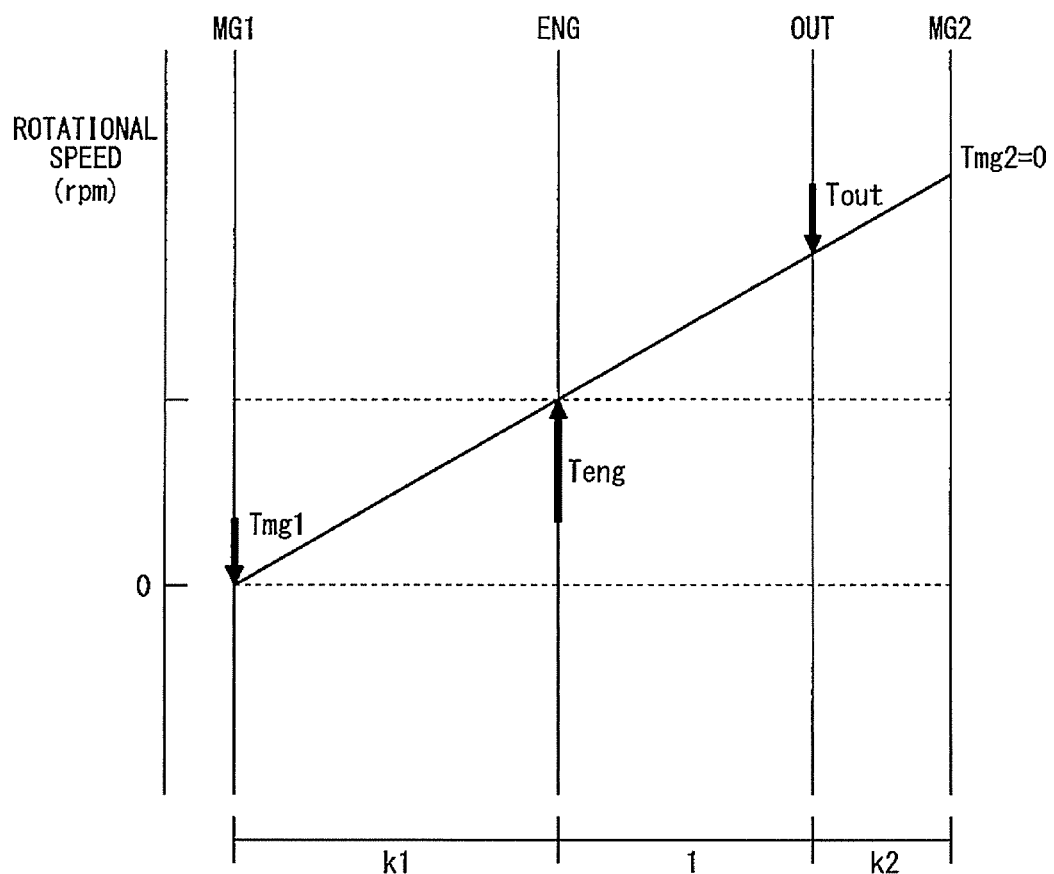
FIG. 3 is an example of collinear diagram for the power split and composition system shown in FIG. 1.

FIG. 3 represents a high-speed drive state in which the vehicle speed is relatively high and engine 2 turns in the positive rotational direction to provide a positive engine torque Teng. Although first motor generator (MG1) 4 provides a negative first motor-generator torque Tmg1, first motor-generator (MG1) 4 does not generate electrical power because the first motor-generator rotational speed is 0 (operation out of regenerating mode). Although second motor generator (MG2) 5 turns in the positive rotational direction at a high speed, second motor-generator torque Tmg2 remains 0. In this case, since a ratio of engine speed of engine 2 to rotational speed of output portion 30, i.e., vehicle speed, called "a gear ratio," is expressed as $k1/(1+k1)$, a state of high gear ratio is established because the transmission ratio is less than 1.

Figure 4:
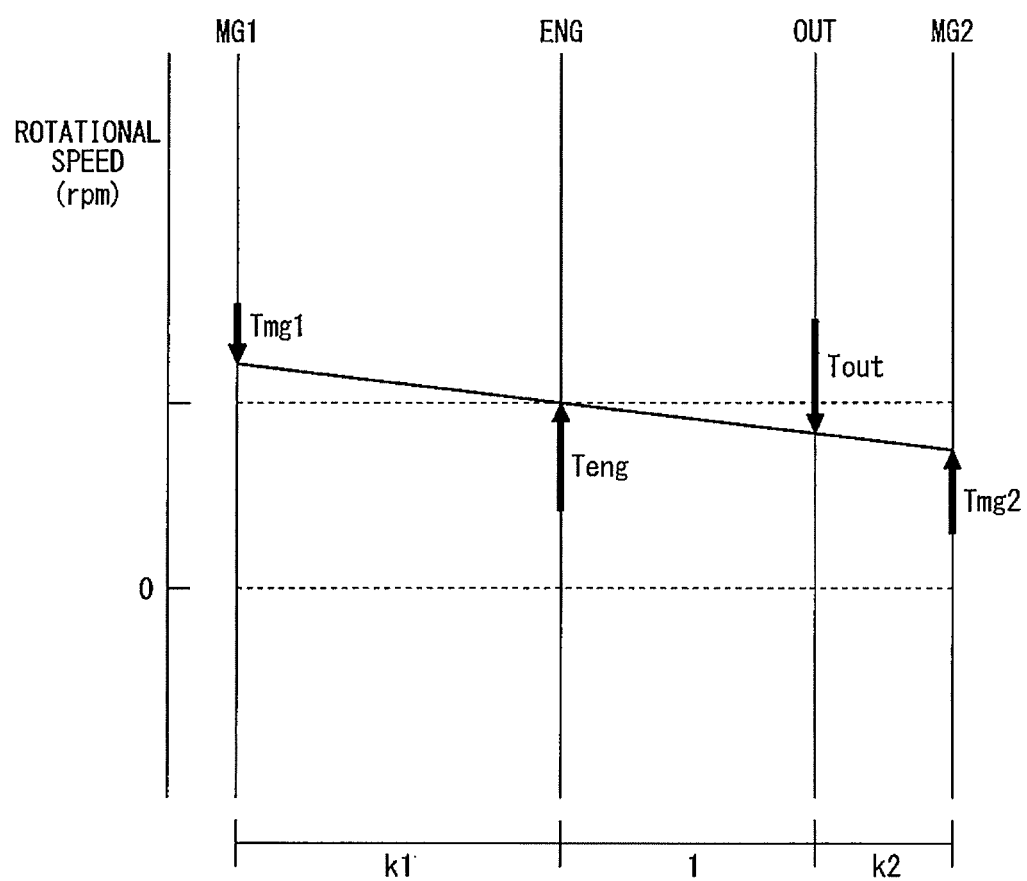
FIG. 4 is an example of collinear diagram for the power split and composition system shown in FIG. 1.

FIG. 4 represents, for example, in the illustrated state, a middle-speed drive state, which corresponds to a state of intermediate gear ratio between the low gear ratio state of FIG. 2 and high gear ratio state of FIG. 3, in which the vehicle speed is middle and engine 2 turns in a positive rotational direction to provide a positive engine torque Teng. First motor generator 4 turns in a positive rotational direction to provide a negative first motor-generator torque Tmg1. First motor generator 4 in fact generates electrical power (operation in regenerating mode). On the other hand, second motor generator 5 generates a positive second motor-generator torque Tmg2 though it turns in a positive rotational direction. Second motor generator 5 in fact is consuming electrical power (operation in power running mode). When there is no charge to or discharge from battery 21, an exchange of electrical energy may be nicely balanced by powering second motor generator 5 with electrical power generated by first motor generator 4.

Thus, it is possible for the power split and composition system according to this embodiment to provide a suitable driving torque Tout to any one of various states of the engine operation by controlling the state of driving first motor generator 4 and the state of driving second motor generator 5 over a wide speed range from low speed to high speed. In principle, the hybrid electric vehicle according to this embodiment in fact does not need any transmission. Moreover, it is possible to drive the vehicle backward even when engine 2 keeps running. It is also possible to drive the vehicle forward or backward when engine 2 is shutdown by only both or one of first motor generator 4 and second motor generator 5. In this case, as JP Patent No. 3852562 describes, rotational speed of engine 2 should be 0, and if a torque is imparted to engine output shaft 3 in the negative direction, this torque would be received by a one-way clutch.

Figure 5:
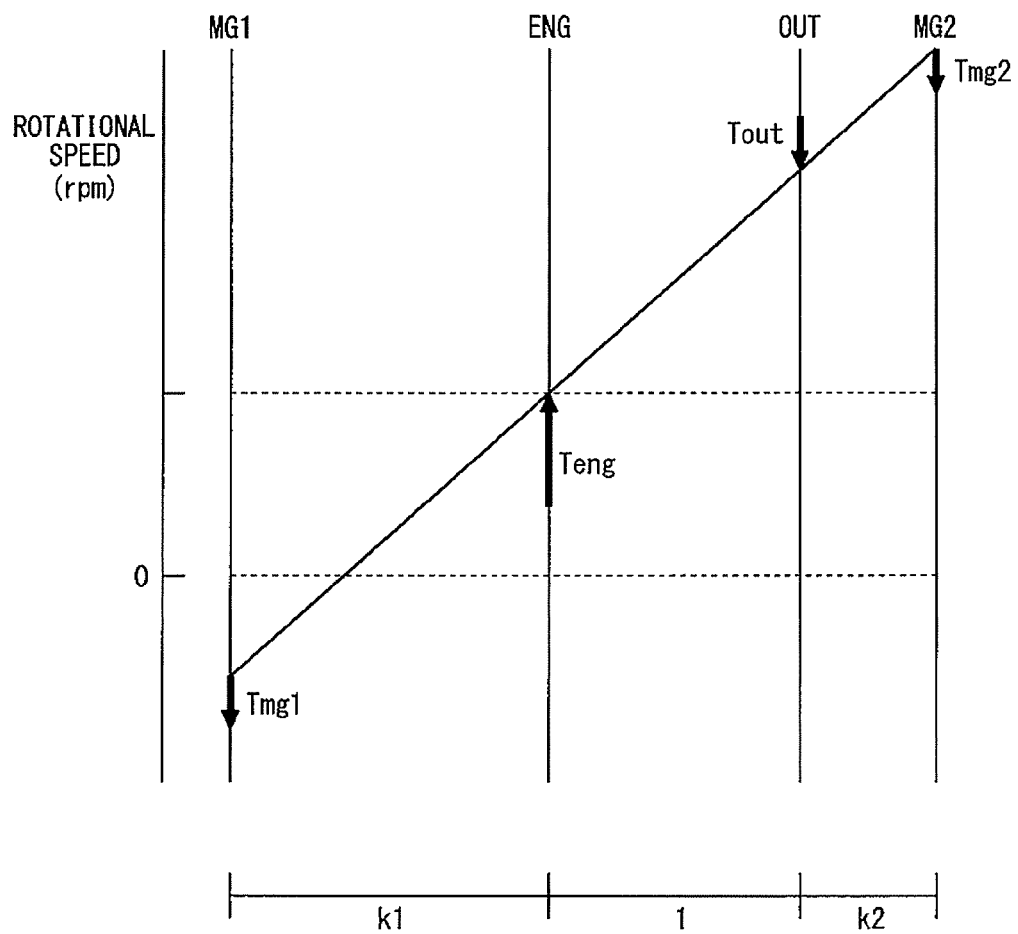
FIG. 5 is an example of collinear diagram for the power split and composition system shown in FIG. 1.

FIG. 5 is a view illustrating power circulation on first and second motor generators 4 and 5. As shown in FIG. 5, in a drive state with a driving speed equal to or higher than the vehicle speed provided when the state of high gear ratio is established as represented by FIG. 3, engine 2 turns in the positive rotational direction to provide a positive engine torque Teng. Then, first motor generator 4 turns in the reverse rotational direction to provide a negative first motor-generator torque Tmg1. First motor generator 4 in fact consumes electrical power (operation in power running mode). On the other hand, although it turns in the positive rotational direction, second motor generator 5 provides a negative second motor-generator torque Tmg2. Second motor generator 5 in fact generates electrical power (operation in regenerating mode). Operating first and second motor generators 4 and 5 in this way that one of them consumes electrical power (operation in power running mode) and the other generates electrical power (operation in regenerating mode) causes power circulation (circulation of power) to occur. Occurrence of such power circulation will reduce the efficiency of powertrain.

Turning back to the configuration of drive control apparatus 1, engine 2 includes: an air quantity adjustment means 10, like a throttle valve, to adjust an air intake condition in response to the position of an accelerator pedal that is not illustrated; a fuel supply means 11, like a fuel injection valve, to adjust a fuel supply condition in response to the air intake condition; and an ignition means 12, like an ignition system, to adjust an ignition condition in response to ignition of fuel. The air quantity adjustment means 10, fuel supply means 11 and ignition means 12 are connected to a drive controller 32 configured to effect drive control.

According to such configuration, the state of burning fuel within engine 2 is controlled by, for example, controlling the air intake condition by air quantity adjustment means 10, the fuel supply condition by fuel supply means 11 and the ignition condition by ignition means 12, resulting in control of drive power from engine 2, specifically control of rotational speed and driving torque, which are hereinafter described as engine speed and engine torque. A one-way clutch, not illustrated, is provided to allow engine output shaft 3 of engine 2 to rotate in one direction only and regulate its rotation in the opposite direction.

Besides, the vehicle has an accelerator position sensor 33 configured to detect, as the accelerator position, the position of accelerator pedal, a driving speed sensor 34 configured to detect the vehicle speed, an engine speed sensor 35 configured to detect, as the engine speed, the rotational speed of engine 2, and a battery state of charge sensor 36 configured to detect the amount of electrical energy stored at a battery 21, which may be referred to as the state of charge (SOC).

Drive controller 32 reads the detection signals from these sensors and controls operating conditions of engine 2, first motor generator 4 and second motor generator 5 by controlling the air quantity adjustment means 10, fuel supply means 11, ignition means 12 and first and second inverters 19 and 20 in accordance with processing described later.

To perform such control, according to this embodiment, drive controller 32 includes an engine control (or an operating point target calculation unit) 40 configured to set up the efficient engine speed and torque for performing the control, and a motor generator control (or a motor torque command calculation) 60 configured to control first and second inverters 19 and 20 in a way that the total power of first and second motor generators 4 and 5 takes on the power target for battery charge/discharge. Incidentally, drive controller 32 is built by a processor, like a microcomputer for example. Said set-up function and control function are built by processing steps performed in drive controller 32.

(Functions of Engine Control 40)

Figure 6:
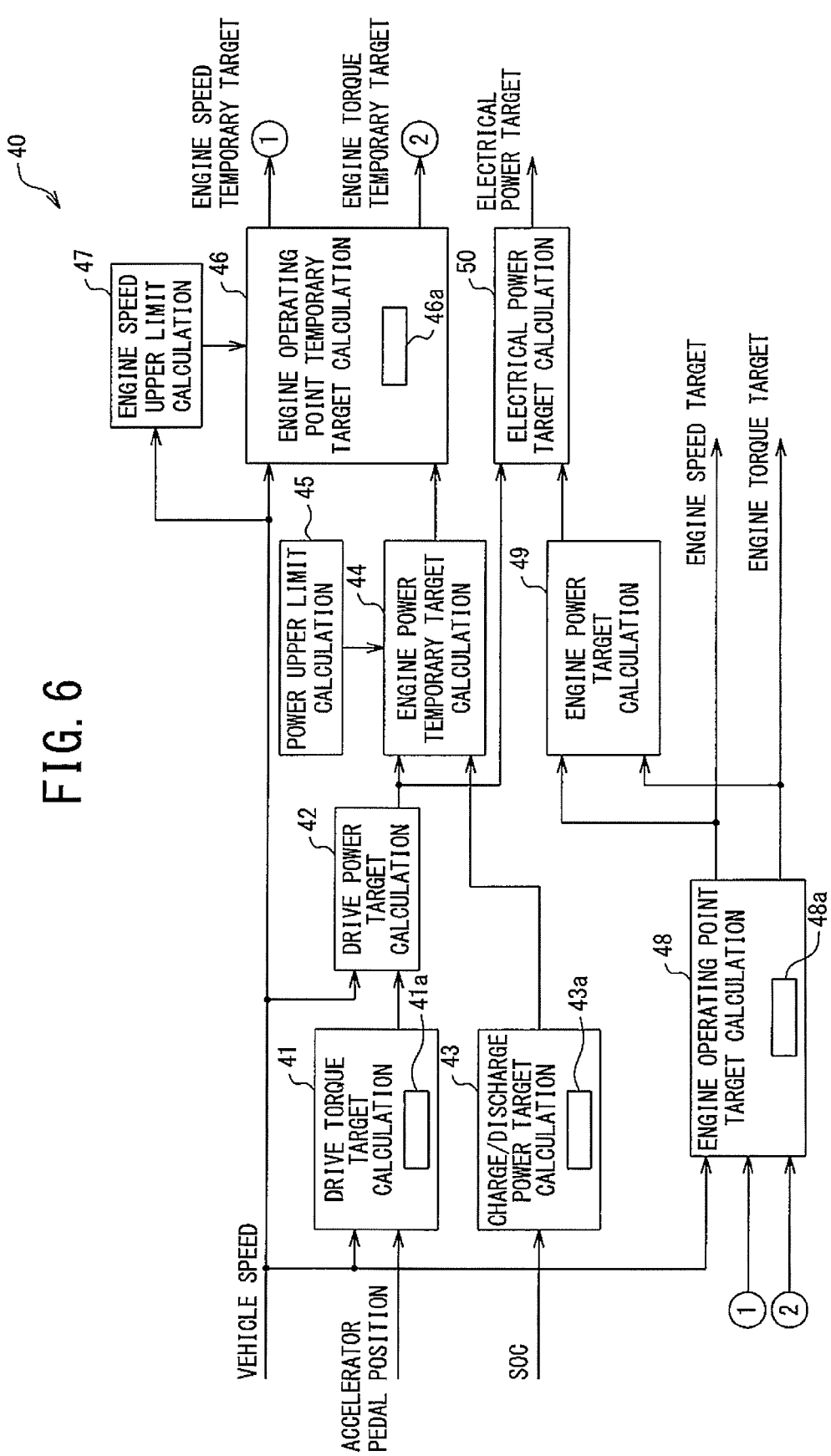
FIG. 6 is a functional block diagram showing an example of the functions of an engine control shown in FIG. 1.

FIG. 6 is a functional block diagram showing one example of functions of engine control 40.

As shown in FIG. 6, engine control 40 includes: a drive torque target calculation function 41; a drive power target calculation function 42; a charge/discharge power target calculation function 43; an engine power temporary target calculation function 44; a power upper limit calculation function 45; an engine operating point temporary target calculation function 46; an engine speed upper limit calculation function 47; an engine operating point target calculation function 48; an engine power target calculation function 49; and an electrical power target calculation function 50.

Figure 7:
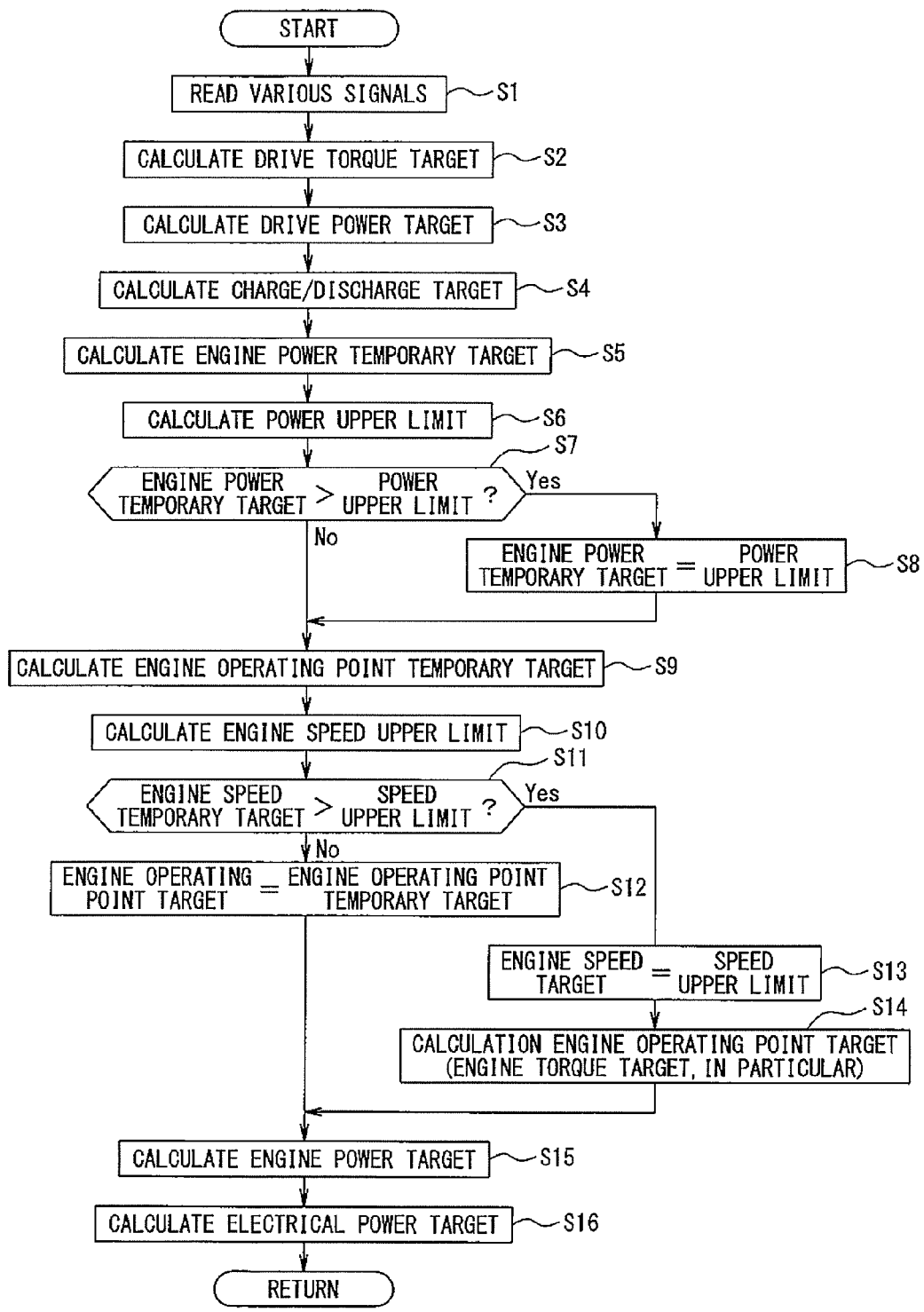
FIG. 7 is a flowchart representing an example of arithmetic processing performed in the engine control shown in FIG. 1.

FIG. 7 illustrates a routine for engine control 40 which is implemented by the functions shown in FIG. 6. This routine may be executed, for example, in accordance with a processing strategy such as interrupt-driven using a timer to generate periodic interrupts, one upon elapse of a predetermined sampling time (for example, 10 msec.).

Referring to the routine of FIG. 7, a description on the content of processing implemented by each of the functions follows:

First, as shown in FIG. 7, at step S1, engine control 40 reads various signals. In this embodiment, engine control 40 reads such various signals from accelerator position sensor 33, driving speed sensor 34 and battery state of charge sensor 36.

At the next step S2, drive torque target calculation function 41 calculates a drive torque target (i.e., a vehicle propelling torque target). In this embodiment, drive torque target calculating function 41 calculates a drive torque target in response to the vehicle speed and accelerator pedal position (which may be equivalent of the amount of depressing of the accelerator pedal) each of which has been read in said step S1. For example, the drive torque target calculation function 41 refers to a drive torque target retrieval map 41a to determine a drive torque target.

Figure 8:
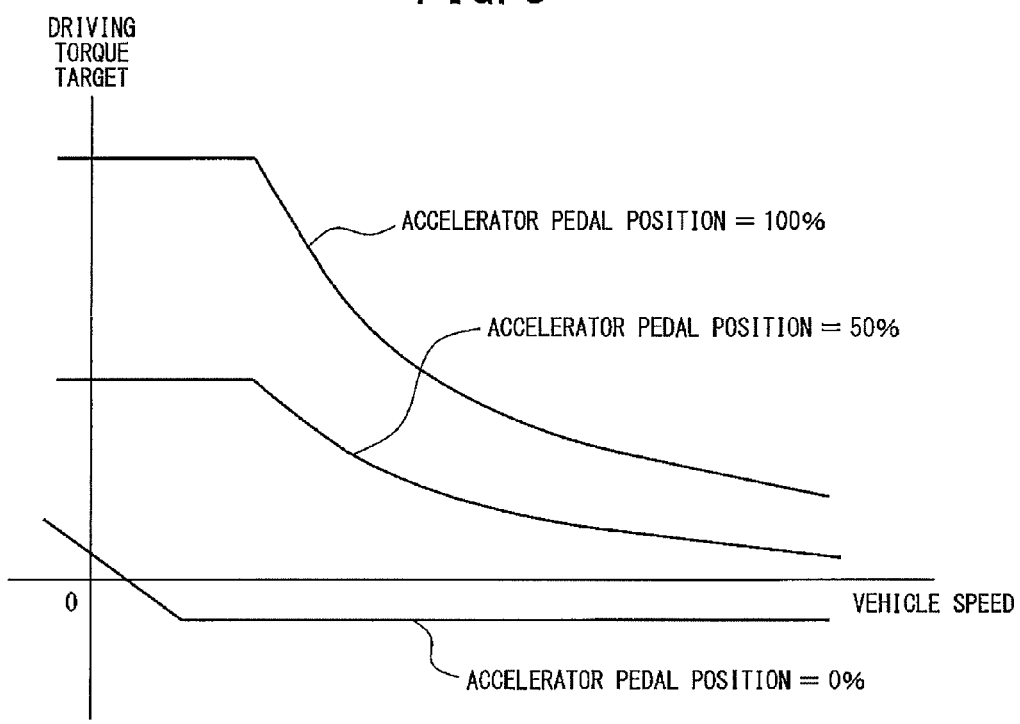
FIG. 8 is an example of map used in the arithmetic processing shown in FIG. 7.

FIG. 8 illustrates one example of a drive torque target retrieval map 41a.

As shown in FIG. 8, drive torque target retrieval map 41a represents the relation among vehicle speed, drive torque target and accelerator pedal position. In drive torque target retrieval map 41a, when the amount of depressing of the accelerator pedal is 0 in a range of high vehicle speeds, the drive torque target takes a negative value to provide drive power in a direction tending to slow down the vehicle as effectively as engine braking might. In a range of low vehicle speeds, the drive torque target takes one of positive values to allow the vehicle to keep rolling slowly ahead or creeping even when the accelerator pedal is released. It may be roughly said that, in drive torque target retrieval map 41a, the less the accelerator pedal position angle, the less the drive torque target is, and the higher the vehicle speed, the less the drive torque target is.

Drive torque target calculation function 41 refers to drive torque target retrieval map 41a to determine a drive torque target. Drive target calculation function 41 provides the determined drive target to drive power target calculation function 42.

At the next step S3, drive power target calculation function 42 calculates a drive power target indicative of the amount of power required for the amount of drive torque indicated by the drive torque target to propel the vehicle. Basically, in this embodiment, drive power target calculation function 42 calculates the drive power target by multiplying the vehicle speed and the drive torque target calculated at said step S2. The setting of drive power target is such that, any of drive power targets falling in a band near the maximum of drive power stays greater than the power upper limit indicative of the maximum of power, later described, which engine 2 is able to provide. Drive power target calculation function 42 provides the calculated drive power target to engine power temporary target calculation function 44 and electrical power target calculation function 50.

At the next step S4, charge/discharge power target calculation function 43 calculates a charge/discharge power target (a charge/discharge amount target) in order to keep the state of charge (SOC) of battery 21 within a range of ordinary use, that is, within a range from a predetermined upper limit to a predetermined lower limit. In this embodiment, target charge/discharge power calculation function 43 refers to a charge/discharge amount target retrieval table 43a to determine the charge/discharge power target.

Figure 9:
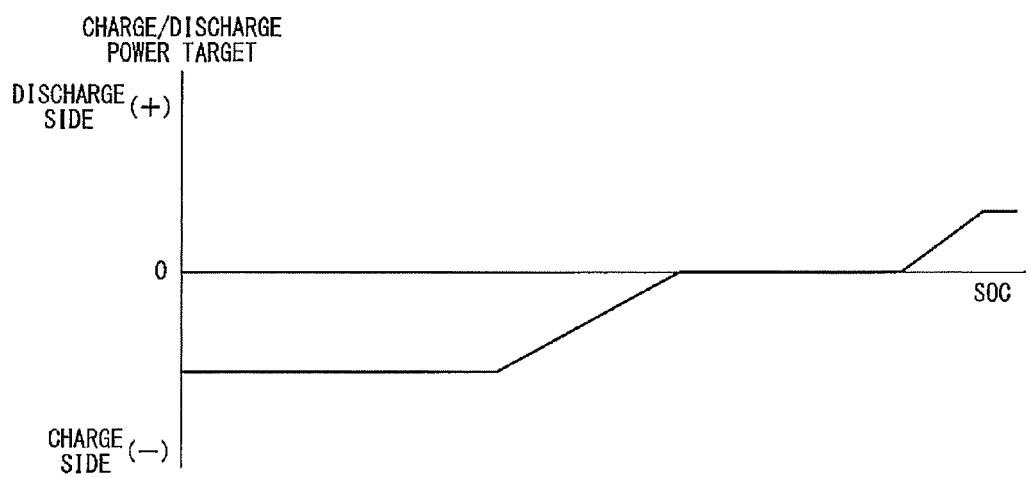
FIG. 9 is an example of table used in the arithmetic processing shown in FIG. 7.

FIG. 9 illustrates one example of a charge/discharge amount target retrieval table 43a.

As shown in FIG. 9, charge/discharge amount target retrieval table 43a represents the relation between SOC and charge/discharge power target. In charge/discharge amount table retrieval table 43a, when SOC is low, the charge/discharge power target takes on a value on the charge side in order to prevent over-discharge from battery 21 by increasing charge power. Moreover, when the battery SOC is high, the charge/discharge power target takes on a value on the discharge side in order to prevent over-charge by increasing discharge power. In target charge/discharge amount target retrieval table 43a, the discharge side is positive and the charge side is negative for convenience.

Charge/discharge power target calculation function 43 refers to charge/discharge amount target retrieval table 43a to determine the charge/discharge power target. Charge/discharge power target calculation function 43 provides the determined charge/discharge power target to engine power temporary target calculation function 44.

At the next step S5, engine power temporary target calculation function 44 calculates an engine power temporary target indicative of the amount of power which engine 2 is required to provide. In this embodiment, engine power temporary target calculation function 44 calculates the engine power temporary target based on the drive power target calculated by drive power target calculation function 42 at said step S3 and the charge/discharge power target calculated by charge/discharge power target calculation function 43 at said step S4.

The engine power temporary target is a value resulting from the amount of power, which is required for propelling the vehicle, as modified by taking the amount of charge/discharge power for battery 21 into consideration (by addition during battery charging, operation in regenerating mode, or subtraction during battery discharging, operation in power running mode). For example, in this embodiment, as the discharge side is negative, engine power temporary target calculation function 44 subtracts the charge/discharge power target from the drive power target during battery discharging (operation in power running mode) to determine the engine power temporary target.

At the next step S6, power upper limit calculation function 45 calculates a power upper limit indicative of an output maximum value which engine 2 is able to provide. The setting is such that the power upper limit is a value determined experimentally or empirically or theoretically. Since this power upper limit is less than the maximum of the drive power target or the neighboring drive power target set up at said step S3, there occurs an operating state with a power assist by electrical power from battery 21. For example, when the accelerator pedal is depressed to nearly 100%, the drive power target grows larger, and the operating state with power assist occurs easily.

The power upper limit calculation function 45 provides the calculated power upper limit to engine power temporary target calculation function 44.

At the next step S7, engine power temporary target calculation function 44 determines whether or not the calculated engine power temporary target is greater than the power upper limit.

If engine power temporary target calculation function 44 determines that the engine power temporary target is greater than the power upper limit (engine power temporary target>power upper limit), the routine proceeds to step S8. However, if engine power temporary target calculation function 44 determines that the engine power temporary target is less than or equal to the power upper limit (engine power temporary target≤power upper limit), the routine proceeds to step S9.

At step S8, engine power temporary target calculation function 44 sets the engine power temporary target to the power upper limit (engine power temporary target=power upper limit). Then, engine power temporary target calculation function 44 allows the routine to proceed to step S9.

According to such steps S7 and S8, engine power temporary target 44 places the engine power temporary target under upper limit guard. Then, engine power temporary target 44 provides the engine power temporary target which has been calculated at step S8 (=power upper limit) or the engine power temporary target which has been calculated at step S5 (≤power upper limit) to engine operating point temporary target calculation function 46.

At step S9, engine operating point temporary target calculation function 46 calculates an engine operating point temporary target (an engine speed temporary target and an engine torque temporary target). In this embodiment, engine operating point temporary target calculation function 46 calculates the engine operating point temporary target based on the vehicle speed and the engine power temporary target which has been calculated by engine operating point temporary target calculation function 46. In concrete terms, engine operating point temporary target calculation function 46 refers to an engine operating point target retrieval map 46a to determine the engine operating point temporary target. Engine operating point temporary target calculation function 46 provides the engine operating point temporary target (engine speed temporary target and engine torque temporary target) to the engine operating point target calculation function 48.

Figure 10:
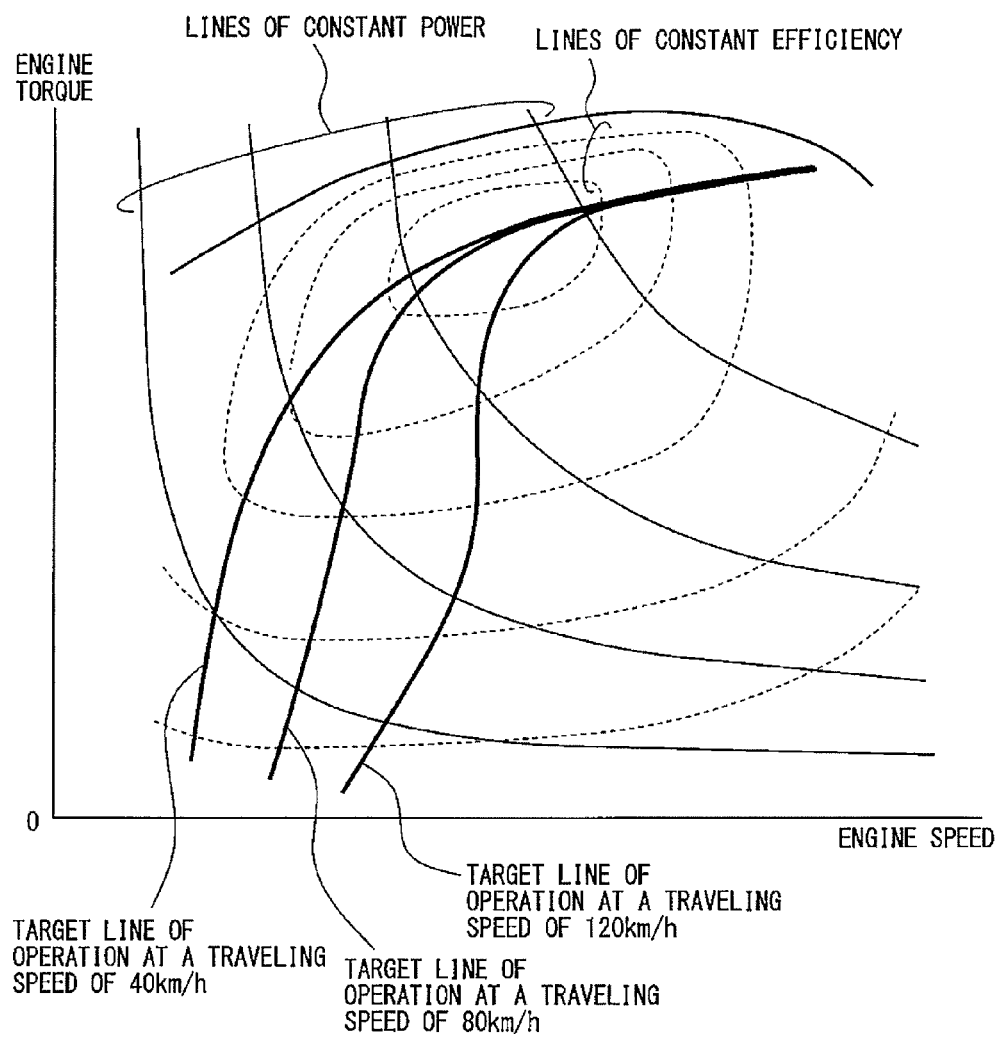
FIG. 10 is an example of the engine characteristic diagram as a control map for retrieval of engine operating point.

FIG. 10 illustrates one example of an engine operating point target retrieval map 46a.

As shown in FIG. 10, engine operating point target retrieval map 46a represents the relation between engine speed (engine speed target), engine torque (engine torque target) and vehicle speed. On the engine operating point target retrieval map, the engine operating point target varies in response to the vehicle speed, and overall the higher the vehicle speed, the higher the engine speed and the lower the engine torque.

Figure 11:
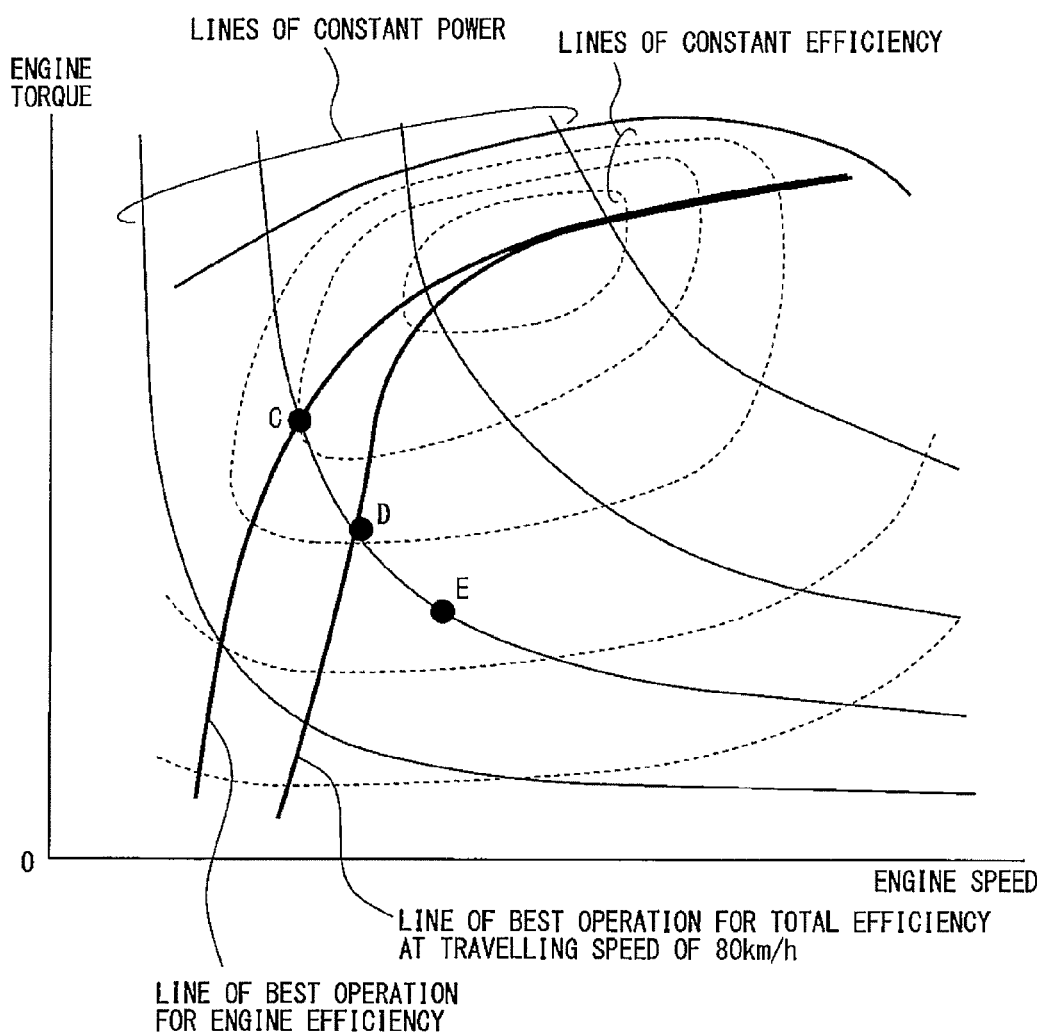
FIG. 11 is an example of the engine characteristic diagram used to illustrate the engine operating points and lines of the engine operation.

The reason that the engine operating point retrieval map 46a has been set is as follows:

Since the engine power is the product of engine speed and engine torque, lines of constant power of the engine power are inverse proportions in form when they are drawn in such a figure as shown in FIG. 11 with the horizontal axis representing engine speed and the vertical axis engine torque. In a characteristic diagram for the engine, there are lines of constant efficiency, each resulting from connecting points of constant efficiency after a function test of the engine. If, for example, the most efficient engine speed and torque are given out of that one of the lines of constant power which is selected for an engine power target which is set as a target to be achieved, it is possible to achieve driving with low fuel consumption, at least efficient function operation of the engine. Connecting these operation points make a line of best operation for engine efficiency as shown in FIG. 11.

The engine speed target and engine torque target which have been set in the above mentioned manner are now represented by an operating point C.

Figure 12:
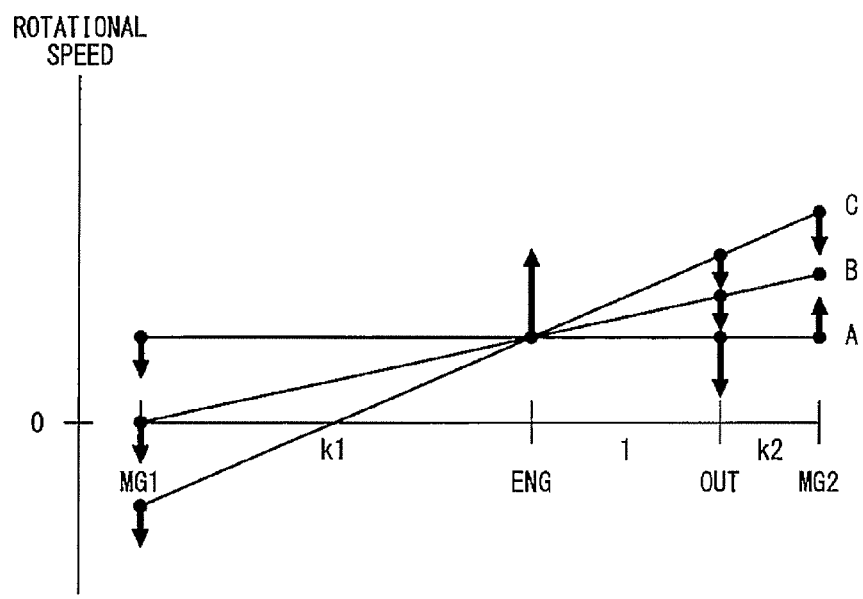
FIG. 12 is an example of collinear diagram for the power split and composition system shown in FIG. 1.

With the engine speed target and the engine torque target set in this manner and fixed, the vehicle speed, i.e. the rotational speed of the output portion, is allowed to vary as shown in FIG. 12. In that case, since the vehicle speed is low and the rotational speed of the output portion is low, both of the first motor generator speed and the second motor generator speed are positive, and the first motor generator torque takes on a positive value and the second motor generator torque takes on a negative value as depicted with a collinear diagram A in FIG. 12. In this case, although first motor generator 4 operates in regenerating mode and second motor generator 5 in power running mode, since the rotational direction of both of them is the positive rotational direction, no power (motive power) circulates.

Similarly, when the vehicle speed takes on a value slightly higher (40 km/h, for example) and the output rotational speed also takes on a slightly higher value, the first motor generator rotational speed is 0, the first motor generator torque takes on a positive value, the second motor generator rotational speed is positive and the second motor generator torque is 0 as depicted with a collinear diagram B in FIG. 12 (same as the state of high gear ratio shown in said FIG. 3). In this case also, no power (motive power) circulates.

However, when the vehicle speed takes on a still higher value (80 km/h, for example) and the output rotational speed takes on a higher value accordingly, the first motor generator rotational speed takes on a negative value, the first motor generator torque takes on a negative value, the second motor generator rotational speed takes on a positive value and the second motor generator torque takes on a negative value as depicted with a collinear diagram C in FIG. 12. In this state, since first motor generator 4 operates in power running mode in the negative rotational direction and second motor generator 5 in regenerating mode, power (motive power) circulates, causing the efficiency of the powertrain to reduce. With the reduction in the efficiency of the powertrain, although the efficiency of the engine is high, the overall efficiency reduces and the efficiency at the operating point C is lower than that at an operating point D.

Figure 13:
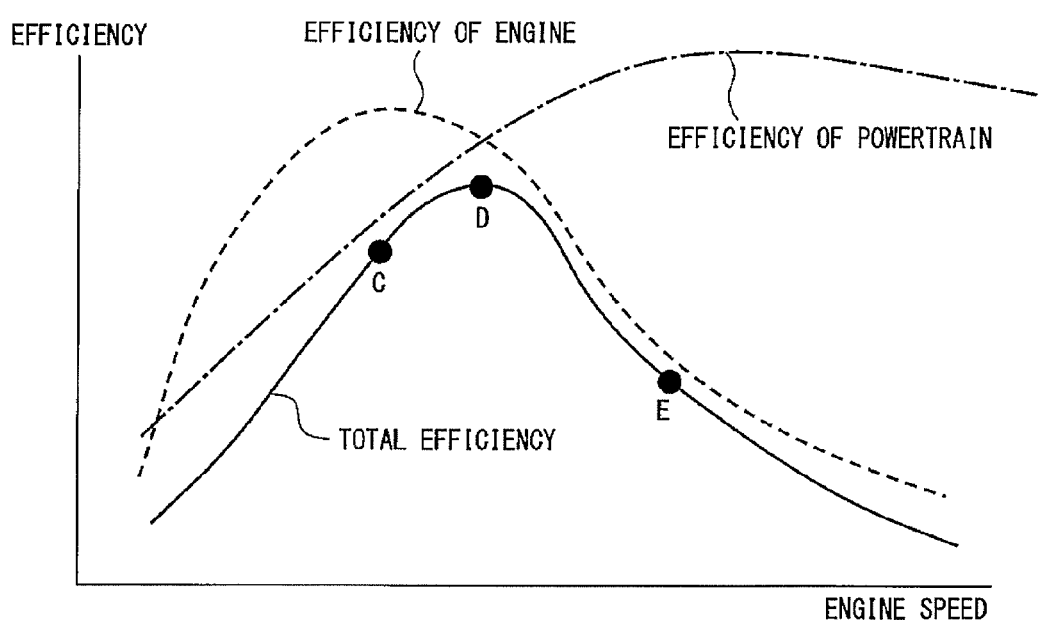
FIG. 13 is an illustration showing an example of the relation between the engine speed and efficiency.
Figure 14:
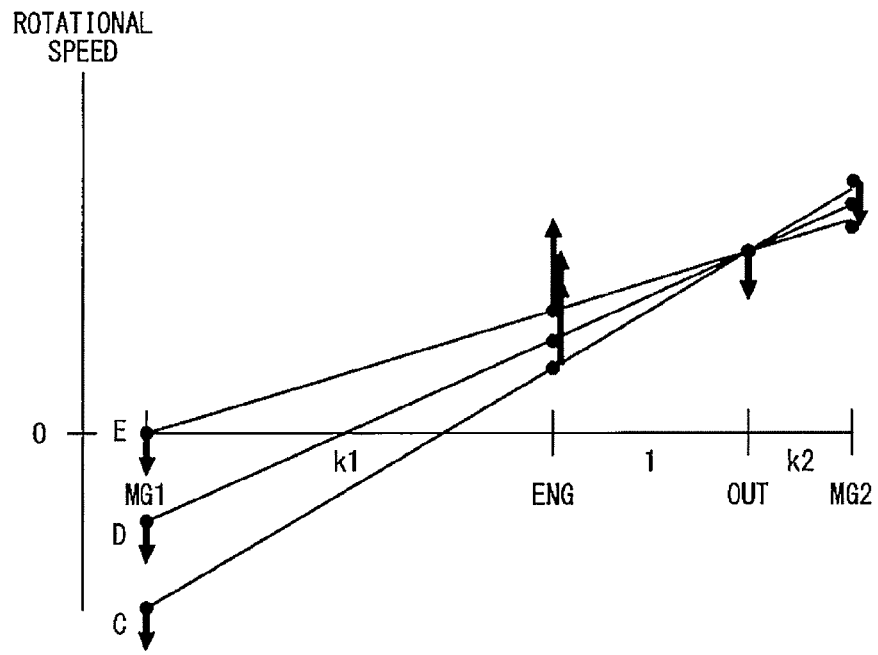
FIG. 14 is an example of collinear diagram for the power split and composition system shown in FIG. 1.

Making the first motor generator rotational speed higher than or equal to 0, as depicted with a collinear diagram E in FIG. 14, may be considered as one approach to prevent power from circulating during driving at such high speed (80 km/h, for example), but this approach causes an increase in engine speed. If there is such increase in engine speed, the overall efficiency reduces though the efficiency of the powertrain is high as depicted at a point E in FIG. 13.

Then, for driving at such high speed (80 km/h, for example), the rotational speed of the engine is set to a point D lying between the point C and the point E as shown in FIG. 13 (see a collinear diagram D in FIG. 14). Referring to FIG. 11, this rotational speed of the engine at this operating point D is used as an engine speed target and an engine torque on the line of constant power for the engine power target versus the engine speed target is used as an engine torque target.

For those reasons, as shown in FIG. 10, the target operating lines used when an engine power target, for example, is set vary with different values of driving speed to provide a setting that, overall, the higher the vehicle speed, the higher the engine speed target and the lower the engine torque target.

At the next step S10, engine speed upper limit calculating function 47 calculates an engine speed upper limit (an upper limit of engine speed). In this embodiment, engine speed upper limit calculating function 47 calculates the engine speed upper limit based on the vehicle speed.

Figure 15:
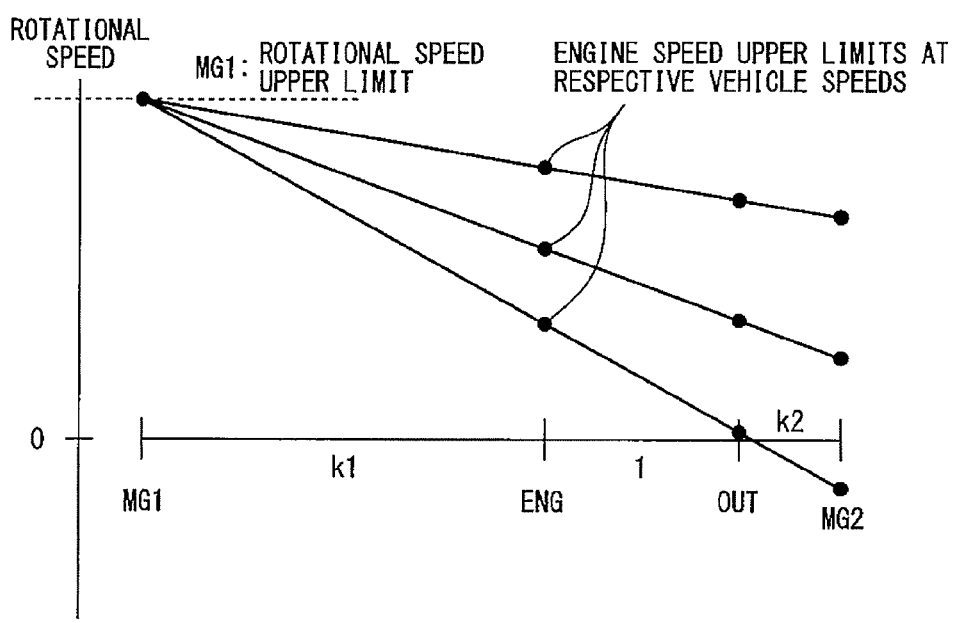
FIG. 15 is an example of collinear diagram for the power split and composition system shown in FIG. 1.

FIG. 15 is a collinear diagram illustrating the relation between a rotational speed upper limit of first motor generator 4, a rotational speed upper limit of engine 2, and a vehicle speed.

As shown in FIG. 15, the rotational speed upper limit of engine 2 is limited by the rotational speed upper limit of first motor generator 4. Moreover, the rotational speed of engine 2 has to be the value which depends on the vehicle speed (the rotational speed of a drive shaft). Under such relation, the engine operating point target calculation function 48 calculates the engine speed upper limit based on the vehicle speed, more concretely, based on the vehicle speed and the rotational speed upon limit of first motor generator 4.

At the next step S11, engine operating point target calculation function 48 compares the engine speed temporary target to the engine speed upper limit determined at step S10 to determine whether or not the engine speed temporary target is greater than the engine speed upper limit. Engine operating point target calculation function 48 proceeds to step S13 if it determines that the engine speed temporary target is greater than the engine speed upper limit (engine speed temporary target>engine speed upper limit). Engine operating point target calculation function 48 proceeds to step S12 if it determines that the engine speed temporary target is less than or equal to the engine speed upper limit (engine speed temporary target≤engine speed upper limit).

At step S12, engine operating point target calculation function 48 uses the engine operating point temporary point (engine speed temporary target and engine torque temporary target) just as it is as a set point of the engine operating point target (engine speed target and engine torque target), (engine operating point target=operating point temporary target). Then, engine operating point target calculation function 48 allows the routine to proceed to step S15.

At step S13, engine operating point target calculation function 48 sets the engine speed target to the engine speed upper limit (engine speed target=engine speed upper limit).

At the next step S14, engine operating point target calculation function 48 calculates an engine torque target. In this embodiment, engine operating point target calculation function 48 refers to an engine operating point target retrieval map 48a, which is similar to the map held by engine operating point temporary target calculation function 46, to calculate an engine torque target versus the engine speed target (engine speed upper limit) set at said step S13. Then, engine operating point target calculation function 48 allows the routine to proceed to step S15.

Engine operating point target calculation function 48 calculates (steps S12 to S14) an engine operating point target (engine speed target and engine torque target) to provide the calculated engine operating point target to engine power target calculation function 49 and motor generator control 60.

At step S15, engine power target calculation function 49 calculates an engine power target. In this embodiment, engine power target calculation function 49 calculates an engine power second target based on the engine operating point target (engine speed target and engine torque target) calculated by engine operating point target calculation function 48.

If, now, the engine speed temporary target exceeds the engine speed upper limit (when it is determined that the answer to step S7 is "Yes"), the engine power target calculated at said step S15 takes on a value less than the engine power temporary target calculated by engine power temporary target calculation function 44, i.e. the value at which the engine is able to produce power practically. If, on the other hand, the engine speed temporary target is equal to or less than the engine speed upper limit (when it is determined that the answer to step S7 is "No"), the engine power target calculated at said step S15 takes on a value equal to the engine power temporary target calculated by engine power temporary target calculation function 44.

Engine power target calculation function 49 provides the calculated engine power target to electrical power target calculation function 50.

At the next step S16, electrical power target calculation function 50 calculates an electrical power target. In this embodiment, electrical power target calculation function 50 calculates an electrical power target by subtracting the engine power target from the drive power target.

The electrical power target means a target value of the amount of supply of electrical power to battery 21 from first motor generator 4 and second motor generator 5 during operation in regenerating mode (charge of battery 21) or the amount of supply of electrical power from battery 21 to first motor generator 4 and second motor generator 5 during operation in power running mode (discharge from battery 21), i.e. a target value of the amount of input/output electrical power to and from battery 21. With regard to the relation between the drive power target and engine power target: when the drive power target is greater than the engine power target, the electrical power target means the amount of power-assist by the battery electrical power (supply of electrical power to first and second motor generators 4 and 5 from battery 21). Since the engine power target means a value of power level at which the engine may produce power in practice, the drive power demanded by the vehicle driver may be provided by creating the amount of power assist in response to the calculated electrical power target. When the engine power target is greater than the drive power target, the electrical power target means the amount of electrical power which may be used to charge the battery 21.

Since, during battery charging (in regenerating mode), the engine power temporary target is the sum of the drive power target and the charge/discharge power target, when the engine speed temporary target is less than or equal to the engine speed upper limit and the engine power target is equal to the engine power temporary target, electrical power target calculation function 50 calculates a value that is equal to the charge/discharge power target (the charge power target in this case) calculated at said step S4 as the electrical power target, i.e., the difference between the engine power target and the drive power target. On the other hand, when the engine speed temporary target is limited by the engine speed upper limit in a way not to exceed the engine speed upper limit and the engine power target is less than the engine power temporary target, electrical power target calculation function 50 calculates, as the electrical power target, a value that is less than the charge/discharge power target (the charge power target in this case) calculated at said step S4. This means that the amount of charge power is reduced during battery charging (in regenerating mode).

On the other hand, during battery discharging (in power running mode), when the engine speed temporary target is less than or equal to the engine speed upper limit and the engine power target is equal to the engine power temporary target, the electrical power target calculation function 50 calculates, as the electrical power target, a value that is equal to the charge/discharge power target (the discharge power target in this case) calculated at said step S4. On the other hand, when the engine speed temporary target is limited by the engine speed upper limit in a way not to exceed the engine speed upper limit and the engine power target is less than the engine power temporary target, electrical power target calculation function 50 calculates, as the electrical power target, a value that is greater than the charge/discharge power target (the discharge power target in this case) calculated at said step S4. This means that the amount of charge power is increased during battery discharging (in power running mode).

Electrical power target calculation function 50 provides the calculated electrical power target (the charge/discharge power target) to motor generator control 60.

Engine control 40 controls the state of air intake by air quantity adjustment means 10, the state of fuel supply by fuel supply means 11 and the state of ignition by ignition means 12 in a way to achieve the calculated engine operating point target, especially the engine torque target.

(Functions of Motor Generator Control 60)

Figure 16:
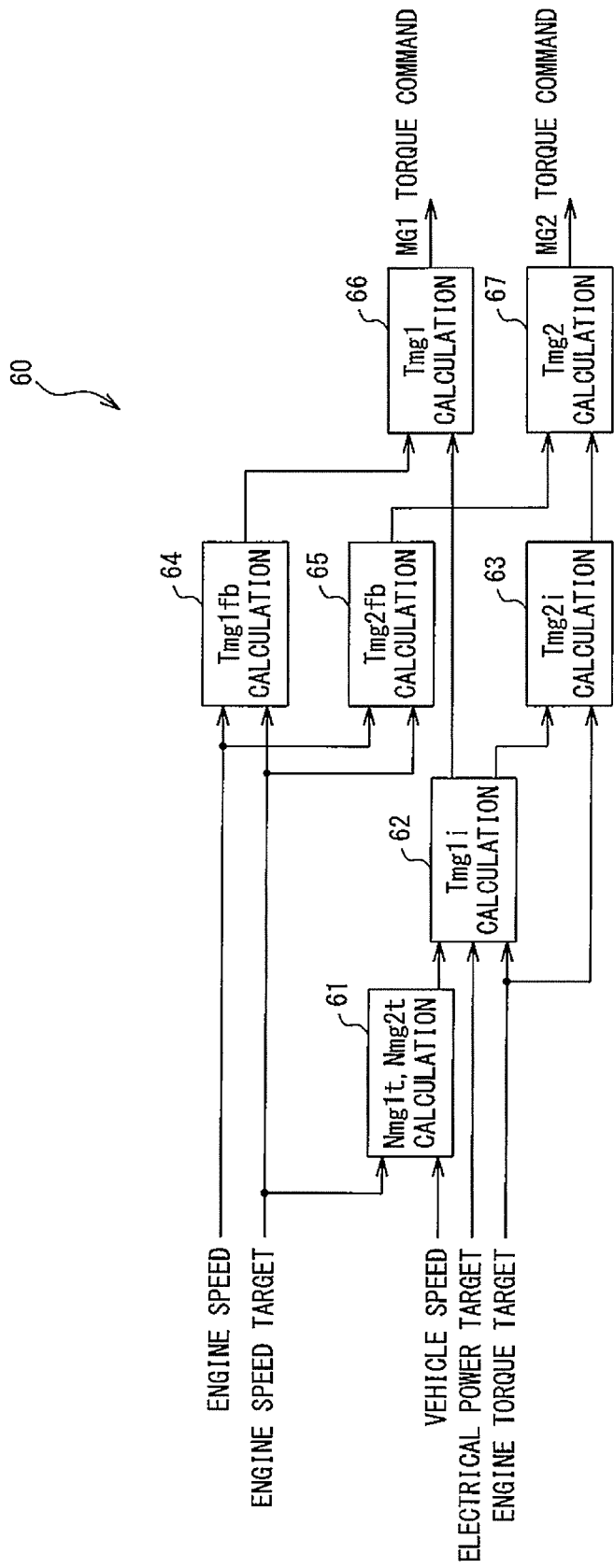
FIG. 16 is a functional block diagram showing an example of the functions of a motor generator control shown in FIG. 1.

FIG. 16 is a functional block diagram showing one example of functions of motor generator control 60.

As shown in FIG. 16, motor generator control 60 includes a motor speed calculation function (a Nmg1$t$ and Nmg2$t$ calculation function) 61, a first and a second base torque calculation function (a Tmg1$i$ calculation function and a Tmg2$i$ calculating function) 62 and 63, a first and a second feedback torque correction calculation function (a Tmg1$fb$ calculation function and a Tmg2$fb$ calculation function) 64 and 65 and a first and a second torque command calculation function (a Tmg1 calculation function and a Tmg2 calculation function) 66 and 67.

Figure 17:
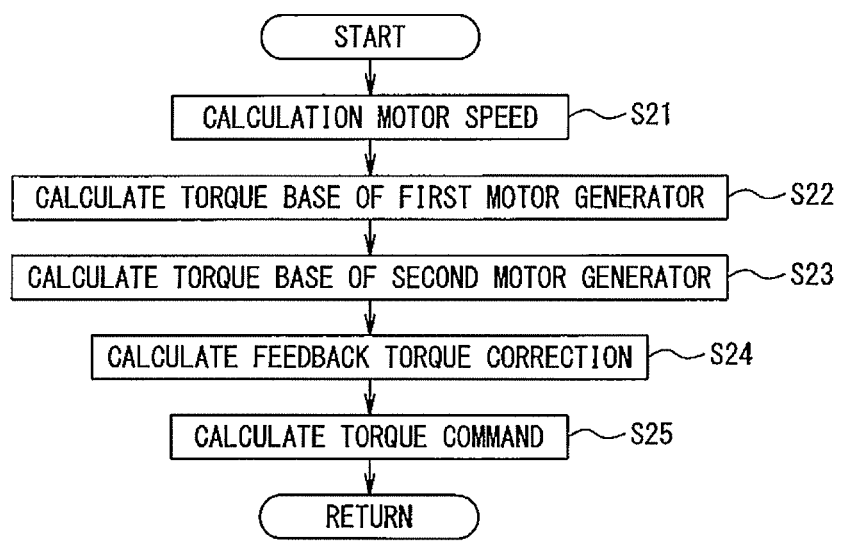
FIG. 17 is a flowchart representing an example of arithmetic processing performed in the motor generator control shown in FIG. 1.

FIG. 17 illustrates a routine for motor generator control 60 which is implemented by the functions shown in FIG. 16. This routine may be executed, for example, in accordance with a processing strategy such as interrupt-driven using a timer to generate periodic interrupts, one upon elapse of a predetermined sampling time (for example, 10 msec.).

Referring to the routine of FIG. 17, a description on the content of processing implemented by each of the functions follows:

First, as shown in FIG. 17, at step S21, motor speed calculation function 61 calculates the drive shaft rotational speed Nout, i.e. the rotational speed of output portion 30 of the planetary gear arrangements, based on the vehicle speed. Thus, the output rotational speed Nout is derived from the vehicle speed, the differential gear ratio and the gear ratio of output gearing 31.

Motor speed calculation function 61 calculates the rotational speed Nmg1$t$ of first motor generator 4 and rotational speed Nmg2$t$ of second motor generator 5 when the engine speed takes on engine speed target Neng. In this embodiment, motor speed calculation function 61 calculates first motor generator speed Nmg1$t$ and second motor generator speed Nmg2$t$ from equations (1) and (2) derived from the relation between rotational speeds of the planetary gear arrangements. The equations are as follows:

$$Nmg1t = (Neng - Nout) \cdot k1 + Neng \quad (1), \text{ and}$$

$$Nmg2t = (Nout - Neng) \cdot k2 + Nout \quad (2),$$

where: k1, k2 are the values resulting from ratios of the number of gears within the planetary gear arrangements, as mentioned before.

Motor speed calculation function 61 provides the calculated first and second motor speeds Nmg1$t$ and Nmg2$t$ to first torque base calculation function 62.

At the next step S22, first torque base calculation function 62 calculates a first torque base for first motor generator 4. In this embodiment, first torque base calculation function 62 calculates first torque base Tmg1$i$ for first motor generator 4 based on electrical power target (the charge/discharge power target) Pbatt calculated by engine control 40, first and second motor generator speeds Nmg1$t$ and Nmg2$t$ calculated at step S21 by motor speed calculation function 61, and engine torque base Tengt calculated by engine control 40. Concretely, first torque base calculation function 62 calculates torque base Tmg1$i$ for first motor generator 4 from equation (3) as follows:

$$Tmg1i = (Pbatt \cdot 60/(2 \cdot \pi) - Nmg2t \cdot Tengt/k2)/(Nmg1t + Nmg2t \cdot (1+k1)/k2) \quad (3).$$

Equation (3) is obtained by solving simultaneous the following equations (4) and (5):

$$Tengt + (1+k1) \cdot Tmg1 = k2 \cdot Tmg2 \quad (4), \text{ and}$$

$$Nmg1 \cdot Tmg1 \cdot 2 \cdot \pi/60 + Nmg2 \cdot Tmg2 \cdot 2 \cdot \pi/60 = Pbatt \quad (5).$$

Equation (4) is an equation expressing a balance of torque inputs to the planetary gear arrangements (a torque balance equation). That is, equation (4) balances torque target Tmg1 of first motor generator 4, torque target Tmg2 of second motor generator 5 and engine torque target Tengt based on the lever ratio derived from ratios in number of teeth of gears of the planetary gear arrangements, which mechanically couple first and second motor generators 4 and 5 to engine 2.

Equation (5) is an equation expressing a balance between the amount of electrical power generated or consumed by first motor generator 4 and second motor generator 5 and the amount of input/output electrical power, as indicated at Pbatt, to and from battery 21 (charge/discharge power), called a power balance equation.

First torque base calculation function 62 provides torque base Tmg1$i$ to second torque base calculation function 63 and first torque command calculation function 66.

At the next step S23, second torque base calculation function 63 calculates torque base Tmg2$i$ of second motor generator 5. In this embodiment, second torque base calculation function 63 calculates torque base Tmg2$i$ of second motor generator 5 based on torque base Tmg1$i$ calculated by first torque base calculation unit 62 at said step S22 and engine torque target Tengt calculated by engine control 40. Concretely, second torque base calculation function 63 calculates torque base Tmg2$i$ of second motor generator 5 from the following equation (6):

$$Tmg2i=(Tengt+(1+k1)\cdot Tmg1i)/k2 \quad (6).$$

This equation (6) is derived from said equation (4).

Second torque base calculation function 63 provides calculated torque base Tmg2$i$ of second motor generator 5 to second torque commanded calculation function 67.

At the next step S24, first and second feedback torque correction calculation functions 64 and 65 calculate respective feedback torque corrections Tmg1$fb$ and Tmg2$fb$ for first motor generator and second motor generators 4 and 5.

In this embodiment, first feedback torque correction calculation function 64 calculates feedback torque correction Tmg1$fb$ for first motor generator 4 based on the engine speed and the engine speed target. Similarly, second feedback torque correction calculation function 65 calculates feedback torque correction Tmg2$fb$ for second motor generator 5 based on the engine speed and the engine speed target.

Concretely, first and second feedback torque correction calculation functions 64 and 65 calculate respective feedback torque corrections Tmg1$fb$ and Tmg2$fb$ by multiplying the deviation of the measured value of the engine speed (the engine speed) from the target value (the engine speed target) by a predetermined feedback gain in order to bring the engine speed close to the engine speed target.

First and second feedback torque correction calculation functions 64 and 65 may provide feedback torque corrections Tmg1$fb$ and Tmg2$fb$ with relevance to ratios in number of teeth of gears of and the lever ratio of the planetary gear arrangements, which have four rotational elements coupled to first motor generator 4, second motor generator 5, drive shafts 7 and engine 2, respectively.

First feedback torque correction calculation function 64 provides the calculated feedback torque correction Tmg1$fb$ for first motor generator 4 to first torque command calculation function 66. Second feedback torque correction calculation function 65 provides the calculated feedback torque correction Tmg2$fb$ for second motor generator 5 to second torque commanded calculation function 67.

At the next step S25, first and second torque command calculation functions 66 and 67 calculate respective torque commands for first and second motor generators 4 and 5.

In this embodiment, first torque command calculation unit 66 calculates a torque command for first motor generator 4 based on torque base Tmg1$i$ for first motor generator 4 calculated by first torque base calculation function 62 at said step S22 and a feedback torque correction Tmg1$fb$ for first motor generator 4 calculated by first feedback torque correction calculation function 64 at said step S24. Similarly, second torque command calculation function 67 calculates a torque command for second motor generator 5 based on torque base Tmg2$i$ for second motor generator 5 calculated by second torque base calculation function 63 at said step S23 and a feedback torque correction Tmg2$fb$ for second motor generator 5 calculated by second feedback torque correction calculation function 65 at said step S24.

Concretely, first and second torque command calculation functions 66 and 67 calculate the torque commands for respective motor generators 4 and 5 by adding torque bases Tmg1$i$ and Tmg2$i$ to feedback torque corrections Tmg1$fb$ and Tmg2$fb$, respectively. That is, first and second torque command calculation functions 66 and 67 set the respective feedback torque corrections so that the actual engine speed may converge to the engine speed target derived from the engine operating point target.

Motor generator control 60 provides the calculated torque commands Tmg1$i$ and Tmg2$i$ for first and second motor generators 4 and 5 to first and second inverters 19 and 20, respectively. First and second inverters 19 and 20 regulate first and second motor generators 4 and 5 based on torque commands Tmg1$i$ and Tmg2$i$, respectively. This causes first and second motor generators 4 and 5 to operate in power running mode or regenerating mode.

(Operation)

According to the drive control apparatus mentioned previously, a drive torque target is calculated in response to the vehicle speed and accelerator pedal position, and a charge/discharge power target is calculated together with calculating a drive power target based on the calculated drive torque target and the vehicle speed (step S1 through step S4). Then, the drive control apparatus calculates an engine power temporary target based on such calculated drive power target and charge/discharge power target (step S5). Moreover, the drive control apparatus keeps the calculated engine power temporary target unchanged when the calculated engine power temporary target is equal to or less than the power upper limit, and sets the engine power temporary target to the power upper limit when the engine power temporary target is greater than the power upper limit (step S6 through step S8).

The drive control apparatus calculates an engine operating point temporary target (an engine speed temporary target and an engine torque temporary target) by referring to the engine operating point target retrieval map based on the engine power temporary target that is kept unchanged or set to the power upper limit and vehicle speed (step S9). On the other hand, the drive control apparatus calculates an engine speed upper limit based on the vehicle speed, and compares such calculated engine speed temporary target to the calculated engine speed upper limit (step S10, step S11). This enables the drive control apparatus to set the engine operating point that remains unchanged as an engine operating point target when the engine speed temporary target is equal to or less than the engine speed upper limit, and the drive control apparatus is enabled to set the engine speed upper limit as an engine speed target when the engine speed temporary target is greater than the engine speed upper limit and then to refer to the engine operating point target retrieval map to recalculate an engine torque target versus the set engine speed target (the engine speed upper limit), (step S12 through step S14).

The drive control apparatus calculates an engine power target based on the engine operating point target (the engine speed target and engine torque target), (step S15), and calculates an electrical power target by subtracting such calculated engine power target from the drive power target (step S16).

During battery charging (in regenerating mode), an electrical power target is calculated as follows:

When an engine speed temporary target is equal to or less than an engine speed upper limit and an engine power target is equal to an engine power temporary target, the drive control apparatus calculates an electrical power target that is equal to a charge/discharge power target (a charge power target, in this case). On the other hand, when, in order for an engine speed temporary target not to exceed an engine speed upper limit, the engine power temporary target is limited by and thus equal to the engine speed upper limit, and an engine power target is less than an engine power temporary target, the drive control apparatus calculates an electrical power target that is equal to a value less than a charge/discharge power target (a charge power target, in this case).

During battery discharging (in power running mode), an electrical power target is calculated as follows:

When an engine speed temporary target is equal to or less than an engine speed upper limit and an engine power target is equal to an engine power temporary target, the drive control apparatus calculates an electrical power target that is equal to a charge/discharge power target (a discharge power target, in this case). On the other hand, when, in order for an engine speed temporary target not to exceed an engine speed upper limit, the engine power temporary target is limited by and thus equal to the engine speed upper limit, and an engine power target is less than an engine power temporary target, the drive control apparatus calculates an electrical power target that is equal to a value greater than a charge/discharge power target (a discharge power target, in this case).

Then, the drive control apparatus controls the air intake condition by air quantity adjustment means 10, the fuel supply condition by fuel supply means 11 and the ignition condition by ignition means 12 so that the calculated engine operating point, especially, the engine torque target, may be realized.

On the other hand, the drive control apparatus calculates torque commands to control the first and second motor generators 4 and 5 based on the before-mentioned calculated engine operating point target, electrical power target and so forth.

That is, the drive control apparatus calculates a drive shaft driving rotational speed Nout of the planetary gear arrangements, and rotational speeds Nmg1t and Nmg2t for first and second motor generators 4 and 5 based on the calculated drive shaft driving rotational speed Nout (step S21). Then, the drive control apparatus calculates a torque base Tmg1i for first motor generator 4 based on electrical power target Pbatt, first and second motor generator speeds Nmg1t and Nmg2t, and engine torque target Tengt (step S22). On the other hand, the drive control apparatus calculates a torque base Tmg2i for second motor generator 5 based on the calculated torque base Tmg1i for first motor generator 4 and engine torque target Tengt (step S23). Moreover, the drive control apparatus calculates feedback torque corrections Tmg1fb and Tmg2fb for first and second motor generators 4 and 5 based on the engine speed and the engine speed target (step S24).

This enables the drive control apparatus to calculate the torque commands for first and second motor generators 4 and 5 based on the calculated torque bases Tmg1i and Tmg2i for first and second motor generators 4 and 5, and the feedback torque corrections Tmg1fb and Tmg2fb for first and second motor generators 4 and 5 (step S25).

The drive control apparatus provides those torque commands Tmg1i and Tmg2i for first and second motor generators 4 and 5 which have been calculated as mentioned above to first and second inverters 19 and 20, respectively. First and second inverters 19 and 20 regulate first and second motor generators 4 and 5 based on such torque commands Tmg1i and Tmg2i for them, respectively. This enables first and second motor generators 4 and 5 to operate in power running mode or in regenerating mode. As a result, the drive control apparatus may realize the battery charge/discharge target for the battery 21 while realizing the drive torque target.

Effect of the Present Embodiment

In the present embodiment, an engine speed final target is calculated so that an engine speed temporary target on that engine operating point temporary target which has been calculated from an initially calculated engine power temporary target may not exceed an upper limit; based on the engine speed final target, an engine operating point target is recalculated; based on the recalculated engine operating point target, an engine power final target is calculated; based on the calculated engine power final target, an electrical power target is calculated; and based on the calculated engine operating point target and electrical power target, motor generators 4 and 5 are regulated, that is, motor generators 4 and 5 are regulated to operate in power running mode or regenerating mode, together with regulation of the torque of engine 2 based on the engine operating point target (the engine torque final target, in particular).

This prevents, in the present embodiment, the engine speed from becoming too high by calculating an engine speed target so that it may not exceed the upper limit, and enables motor generators 4 and 5 to operate in power running mode by calculating an electrical power target based on the engine speed target calculated not to exceed the upper limit, thus compensating for a reduction in the engine output to satisfy drive torque requested by the vehicle driver. Therefore, the drive torque requested by the vehicle driver may be satisfied by a power assist created using the electrical power of battery 21 with the SOC of battery 21 kept within a predetermined range and the engine speed prevented from being too high.

On the other hand, in the present embodiment, an engine operating point target is calculated based on an engine speed first target that is so calculated as not to exceed an upper limit, and, based on the calculated engine operating point target, an electrical power target, as determined in consideration of a drive power target, is calculated based on the calculated target engine operating point. That is, according to this embodiment, an appropriate engine operating point is determined while realizing a drive power target and an electrical power target.

In the present embodiment, taking the engine operating point into consideration, both the drive power which is aimed at and the state of charge/discharge which is aimed at (SOC kept within a predetermined range) are ensured.

In the present embodiment, an engine power target is calculated not to exceed the power upper limit which has been set for an engine power temporary target.

This ensures, in the present embodiment, a power-assist range using electrical power from battery 21, regulating the engine so that its operating point may be adjusted to an optimal operating point and keeping the SOC of battery 21 within a predetermined range. Therefore, the present embodiment enables propelling the vehicle using electrical power from battery 21 by utilizing the power-assist range in response to the vehicle driver's request. Moreover, two or more motor generators 4 and 5 may be regulated during charge/discharge of battery 21.

On the other hand, in the present embodiment, an engine speed upper limit is calculated based on the vehicle speed and the rotational speed upper limit for first motor generator 4.

Therefore, the present embodiment makes it possible to calculate the appropriate engine speed upper limit agreeable with the property of the hybrid electric vehicle according to the present embodiment which limits the engine speed upper limit of engine 2 with the rotational speed upper limit of first motor generator 4 and allows it to vary in response to the vehicle speed.

In this embodiment, a feedback correction is provided for each of torque commands to motor generators 4 and 5 in order to let an actual engine speed approach an engine speed target determined from an engine operating target. Thus, in the present embodiment, fine correction of the torque commands to motor generators 4 and 5 may be made by providing the feedback corrections in this manner, making it possible to let the engine speed quickly approach the engine speed target. Thus, in this embodiment, the engine operating point may quickly agree with the operating point target, making it possible to quickly realize the appropriate operating state.

Preferably, in the present embodiment, it is desirable to apply a drive control apparatus, for a hybrid electric vehicle, which controls drive power of the vehicle using outputs of an engine and a plurality of motor generators, to a drive control apparatus, for a hybrid electric vehicle, which includes: an accelerator pedal position detection function for detecting an accelerator pedal position; a vehicle speed detection function for detecting vehicle speed; a battery state-of-charge detection function for detecting state-of-charge of a battery; a drive power target setup function for setting up a drive power target based on the accelerator pedal position detected by the accelerator pedal position detecting function and the vehicle speed detected by the vehicle speed detection function; a charge/discharge power target setup function for setting up a charge/discharge power target based on at least the state-of-charge of the battery detected by the battery state-of-charge detection function; and a motor torque command determination function for setting up torque commands for the plurality of motor generators.

With regard to the preceding description of the embodiment, it should not be understood that the scope of this invention is limited to the illustrated and described exemplary embodiments, and all the embodiments which brings equal effects which the present invention aims at are also involved. Furthermore, the scope of the present invention should not be limited to the combination of features of the invention defined in Claim 1, but may be defined by any one of desired combinations of the specific features selected from all of the disclosed features.

DESCRIPTION OF NOTATIONS

1 Drive control apparatus for a hybrid electric vehicle; 40 Engine control; 41 Drive target calculation function; 42 Drive power target calculation function; 43 Charge/discharge power target calculation function; 44 Engine power temporary target calculation function; 45 Power upper limit calculation function; 46 Engine operating point temporary target calculation function; 46a, 48a Engine operating point target retrieval maps; 47 Engine speed upper-limit calculation function; 48 Engine operating point target calculation function; 49 Engine power target calculation function; 50 Electrical power target calculation function; and 60 Motor generator control.

What is claimed is:

1. A drive control apparatus for providing a drive control to a hybrid electric vehicle by controlling an engine and motor generators, which are operable to give a charge of electrical power to a battery and receive a supply of electrical power from said battery, to power the vehicle with driving force derived from said engine and said motor generators, the drive control apparatus comprising:

a drive power target calculation function for calculating a drive power target based on an accelerator pedal position and a vehicle speed;

a charge/discharge power target calculation function for calculating a charge/discharge electrical power target to/from said battery based on a state of charge/discharge of said battery;

an engine power first target calculation function for calculating an engine power first target based on the drive power target, which is calculated by said drive power target calculation function, and the charge/discharge electrical power target, which is calculated by said charge/discharge power target calculation function;

an engine operating point first target calculation function for calculating an engine speed first target and an engine torque first target, both of which correspond to the engine power first target calculated by said engine power first target calculation function, based on information of the engine operating point identified by the relation between engine speed and engine torque;

an engine speed first target upper limit calculation function for calculating an upper limit of said engine speed first target based on the vehicle speed;

an engine speed second target calculation function for calculating an engine speed second target indicative of the engine speed first target which is calculated by said engine operating point calculation function so as not to exceed that upper limit of the engine speed first target which is calculated by said engine speed first target upper limit calculation function;

an engine torque second target calculation function for calculating an engine torque second target, which corresponds to said engine speed second target calculated by said engine speed second target calculation function, based on said information of the engine operating point;

an engine power second target calculation function for calculating an engine power second target based on the engine speed second target which is calculated by said engine speed second target calculation function and the engine torque second target which is calculated by said engine torque second target calculation function;

an electrical power target calculation function for calculating an electrical power target indicative of the amount of electrical power to be generated by driving said motor generators to charge said battery or to be provided by said battery to said motor generators to drive said motor generators, based on a difference between the drive power target which is calculated by said drive power target calculation function and the engine power second target which is calculated by said engine power second target calculation function;

an engine control configured to control torque of said engine based on the engine torque second target which is calculated by said engine torque second target calculation function; and a motor generator control configured to control said motor generators based on the engine speed second target which is calculated by said engine speed second target calculation function, the engine torque second target which is calculated by said engine torque second target calculation function, and the electrical power target which is calculated by said electrical target calculation function.

2. The drive control apparatus according to claim 1,
further comprising an engine power target upper limit calculation function for calculating, as an upper limit of said engine power first target, a maximum of output which said engine is able to provide; and
wherein said engine power first target calculation function calculates said engine power first target so as not to exceed the upper limit which is calculated by said engine power target upper limit calculation function.

3. The drive control apparatus according to claim 1,
comprising a power split and composition system having four axes with each of rotary elements of two planetary gear arrangements connected;
wherein two motor generators are connected to said battery;
wherein, in a manner that one of said motor generators, said engine, a drive shaft connected to a traction wheel, and the other of said motor generators are located on a collinear diagram, the four axes of said power split and composition system are connected to said one motor generator, said engine, said drive shaft and said the other motor generator, respectively;
wherein an upper limit of said engine speed is restricted by an upper limit of rotational speed of said one motor generator and undergoes a change depending on the vehicle speed; and
wherein said engine speed first target upper limit calculation function calculates the upper limit of said engine speed first target based on said vehicle speed and an upper limit of rotational speed of said one motor generator.

4. A hybrid electric vehicle comprising:
an engine and motor generators, which are operable to give a charge of electrical power to a battery and receive a supply of electrical power from said battery, to power the vehicle with driving force derived from said engine and said motor generators;
a drive control apparatus comprising:
a drive power target calculation function for calculating a drive power target based on an accelerator pedal position and a vehicle speed;
a charge/discharge power target calculation function for calculating a charge/discharge electrical power target to/from said battery based on a state of charge/discharge of said battery;
an engine power first target calculation function for calculating an engine power first target based on the drive power target, which is calculated by said drive power target calculation function, and the charge/discharge electrical power target, which is calculated by said charge/discharge power target calculation function;
an engine operating point first target calculation function for calculating an engine speed first target and an engine torque first target, both of which correspond to the engine power first target calculated by said engine power first target calculation function, based on information of the engine operating point identified by the relation between engine speed and engine torque;
an engine speed first target upper limit calculation function for calculating an upper limit of said engine speed first target based on the vehicle speed;
an engine speed second target calculation function for calculating an engine speed second target indicative of the engine speed first target which is calculated by said engine operating point calculation function so as not to exceed that upper limit of the engine speed first target which is calculated by said engine speed first target upper limit calculation function;
an engine torque second target calculation function for calculating an engine torque second target, which corresponds to said engine speed second target calculated by said engine speed second target calculation function, based on said information of the engine operating point;
an engine power second target calculation function for calculating an engine power second target based on the engine speed second target which is calculated by said engine speed second target calculation function and the engine torque second target which is calculated by said engine torque second target calculation function;
an electrical power target calculation function for calculating an electrical power target indicative of the amount of electrical power to be generated by driving said motor generators to charge said battery or to be provided by said battery to said motor generators to drive said motor generators, based on a difference between the drive power target which is calculated by said drive power target calculation function and the engine power second target which is calculated by said engine power second target calculation function;
an engine control configured to control torque of said engine based on the engine torque second target which is calculated by said engine torque second target calculation function; and
a motor generator control configured to control said motor generators based on the engine speed second target which is calculated by said engine speed second target calculation function, the engine torque second target which is calculated by said engine torque second target calculation function, and the electrical power target which is calculated by said electrical target calculation function.

5. A drive control method for providing a drive control to a hybrid electric vehicle by controlling an engine and motor generators, which are operable to give a charge of electrical power to a battery and receive a supply of electrical power from said battery, to power the vehicle with driving force derived from said engine and said motor generators, the drive control method comprising the steps of:
calculating a drive power target based on an accelerator pedal position and the vehicle speed;
calculating a charge/discharge electrical power target to/from said battery based on a state-of-charge/discharge of said battery;
calculating an engine power first target based on said drive power target and said charge/discharge electrical power target;
calculating an engine speed first target and an engine torque first target, both of which correspond to said engine power first target, based on information of the engine operating point identified by the relation between engine speed and engine torque;
calculating an upper limit of said engine speed first target based on a vehicle speed;
calculating an engine speed second target indicative of the engine speed first target so as not to exceed said upper limit of the engine speed first target;
calculating an engine torque second target, which corresponds to said engine speed second target, based on said information of engine operating point;
calculating an engine power second target based on said engine speed second target and said engine torque second target;

calculating an electrical power target indicative of the amount of electrical power to be generated by driving said motor generators to charge said battery or to be provided by said battery to said motor generators to drive said motor generators, based on a difference between said drive power target and said engine power second target;

controlling torque of said engine based on said engine torque second target and controlling said motor generators based on said engine speed second target, said engine torque second target, and said electrical power target.

6. A drive control apparatus according to claim 1, wherein the control apparatus is configured such that the engine speed second target calculation function sets the engine speed second target to the engine speed first target when the engine speed first target is less than the upper limit of the engine speed first target calculated by said engine speed first target upper limit calculation function; and further wherein the control apparatus is configured such that the engine speed second target calculation function sets the engine speed second target to the upper limit of the engine speed first target calculated by said engine speed first target upper limit calculation function when the engine speed first target is greater than the upper limit of the engine speed first target.

7. A drive control method according to claim 5, wherein the calculating of the engine speed second target includes setting the engine speed second target as the engine speed first target when the engine speed first target is less than the upper limit of said engine speed first target, and setting the engine speed second target as the upper limit of said engine speed first target when the engine speed first target is greater than the upper limit of said engine speed first target.

* * * * *